US009441731B2

(12) United States Patent
Masunaga et al.

(10) Patent No.: US 9,441,731 B2
(45) Date of Patent: Sep. 13, 2016

(54) SHIFT CONTROL DEVICE AND SHIFT CONTROL METHOD FOR VEHICLE

(71) Applicants: Seiji Masunaga, Susono (JP); Yoshio Hasegawa, Chiryu (JP); Keisuke Ota, Susono (JP)

(72) Inventors: Seiji Masunaga, Susono (JP); Yoshio Hasegawa, Chiryu (JP); Keisuke Ota, Susono (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 14/432,285

(22) PCT Filed: Jan. 3, 2014

(86) PCT No.: PCT/IB2014/000178
§ 371 (c)(1),
(2) Date: Mar. 30, 2015

(87) PCT Pub. No.: WO2014/111810
PCT Pub. Date: Jul. 24, 2014

(65) Prior Publication Data
US 2015/0260280 A1    Sep. 17, 2015

(30) Foreign Application Priority Data

Jan. 18, 2013 (JP) .................................. 2013-007801

(51) Int. Cl.
*F16H 61/04* (2006.01)
*F16H 61/02* (2006.01)
(Continued)

(52) U.S. Cl.
CPC ...... *F16H 61/0213* (2013.01); *F16H 61/0437* (2013.01); *F16H 61/061* (2013.01); *F16H 61/686* (2013.01); *F16H 2061/0081* (2013.01);
(Continued)

(58) Field of Classification Search
CPC .......... Y10T 477/693635; Y10T 477/693636; Y10T 477/693637; Y10T 477/6937; Y10T 477/69373; F16H 61/0213; F16H 61/686; F16H 61/0437; F16H 61/061; F16H 2061/0451; F16H 2061/0455; F16H 2061/0093; F16H 2061/0081
USPC .......................................................... 701/57
See application file for complete search history.

(56) References Cited

U.S. PATENT DOCUMENTS 5,315,898 A * 5/1994 Koyama ................. F16H 3/666
475/116
2002/0086761 A1* 7/2002 Hayabuchi .......... F16H 61/0437
475/127

(Continued)

FOREIGN PATENT DOCUMENTS

JP    2000097325 A    4/2000
JP    2008051186 A    3/2008

(Continued)

*Primary Examiner* — Roger Pang
(74) *Attorney, Agent, or Firm* — Oliff PLC

(57) ABSTRACT

Torque shares that express an exchange of torque are set as a constraint condition of an equation of motion of an automatic transmission, so it is suitable to control an exchange of torque between engagement devices, which is difficult in shift control, and it is possible to solve the equation of motion. In other words, it is possible to handle any shift pattern with the use of a predetermined shift model. Furthermore, at the time of a shift in which two elements are released and two elements are engaged, a first shift and a second shift in each of which one element is released and one element is engaged are carried out, so three control operation amounts are used in each of the first shift and the second shift, with the result that it is possible to solve the equation of motion.

10 Claims, 10 Drawing Sheets

(51) Int. Cl.
  *F16H 61/06* (2006.01)
  *F16H 61/686* (2006.01)
  *F16H 61/00* (2006.01)

(52) U.S. Cl.
  CPC .......... *F16H 2061/0093* (2013.01); *F16H 2061/0451* (2013.01); *F16H 2061/0455* (2013.01); *Y10T 477/6937* (2015.01); *Y10T 477/69373* (2015.01); *Y10T 477/693635* (2015.01); *Y10T 477/693636* (2015.01); *Y10T 477/693637* (2015.01)

(56) References Cited

U.S. PATENT DOCUMENTS

| | | | |
|---|---|---|---|
| 2003/0022756 A1* | 1/2003 | Ayabe | F16H 61/061 477/109 |
| 2003/0163235 A1* | 8/2003 | Tokura | B60W 10/06 701/67 |
| 2004/0043857 A1* | 3/2004 | Nishida | F16H 61/061 475/125 |
| 2009/0210121 A1 | 8/2009 | Tokura et al. | |
| 2011/0021311 A1* | 1/2011 | Kim | B60W 10/08 477/3 |
| 2011/0315499 A1 | 12/2011 | Fukushiro et al. | |
| 2015/0252891 A1* | 9/2015 | Masunaga | F16H 61/686 701/51 |

FOREIGN PATENT DOCUMENTS

| | | |
|---|---|---|
| JP | 2008064240 A | 3/2008 |
| JP | 2009192021 A | 8/2009 |
| JP | 2010084945 A | 4/2010 |
| WO | 2014020685 A1 | 2/2014 |

* cited by examiner

|  | C1 | C2 | C3 | C4 | B1 | B2 | F1 |
|---|---|---|---|---|---|---|---|
| 1st | ○ |  |  |  |  | (○) | ○ |
| 2nd | ○ |  |  |  | ○ |  |  |
| 3rd | ○ |  | ○ |  |  |  |  |
| 4th | ○ |  |  | ○ |  |  |  |
| 5th | ○ | ○ |  |  |  |  |  |
| 6th |  | ○ |  | ○ |  |  |  |
| 7th |  | ○ | ○ |  |  |  |  |
| 8th |  | ○ |  |  | ○ |  |  |

○ : ENGAGED  (○) : ENGAGED WHEN BEING DRIVEN

SHIFT CONTROL DEVICE AND SHIFT CONTROL METHOD FOR VEHICLE

BACKGROUND OF THE INVENTION

1. Field of the Invention

The invention relates to a shift control device and shift control method for a vehicle, which execute shift control over an automatic transmission and, more particularly, to a technique for shifting the automatic transmission using a shift model.

2. Description of Related Art

There is well known an automatic transmission that includes a plurality of engagement devices, which transmit rotation and torque between an input shaft that receives power from a driving force source and an output shaft that transmits power to drive wheels, and that is shifted by causing each of the engagement devices to switch between an engaged state and a released state. Generally, in such an automatic transmission, a required value (that is, a control operation amount) of an element (for example, torque, or the like) that is operated for a controlled object is adapted for each gear speed while carrying out evaluations in an actual vehicle, and the automatic transmission is shifted using the control operation amount that is determined from a control map obtained in advance for each gear speed on the basis of the adapted result. However, with an increasing number of speeds of an automatic transmission, enormous effort is required for adaptation work, and it is becoming more difficult to employ a mode of shift control based on control maps. Therefore, there is suggested shift model control that is a mode of shift control based on the equation of motion in each of rotating elements that constitute an automatic transmission. In such shift model control, a control operation amount is uniquely determined by solving the equation of motion obtained in advance on the basis of a desired variation mode (shift target value) during shifting, and a shift is carried out on the basis of the determined control operation amount. For example, Japanese Patent Application Publication No. 2000-97325 (JP 2000-97325 A) describes a technique for carrying out a shift by, in inertia phase control, setting a target value of an input shaft rotation speed of a transmission as a shift target value and calculating a required value of an engaged-side clutch torque as a control operation amount with the use of a shift model, and a technique for carrying out a shift by setting a target value of an input shaft rotation speed of a transmission and a target value of an output shaft torque of the transmission as shift target values and calculating a required value of an engaged-side clutch torque and a required value of a released-side clutch torque as control operation amounts with the use of a shift model.

Incidentally, in the technique described in JP 2000-97325 A, a shift is carried out by manipulating one controlled object for one shift target value or operating two controlled objects for two shift target values. However, in the technique described in JP 2000-97325 A, in order to cancel inertia torque during inertia phase (in other words, in order for output shaft torque during inertia phase not to substantially vary), the hydraulic pressure of the released-side engagement device is gradually decreased to release the released-side engagement device and is then temporarily gradually increased to engage the released-side engagement device again. Therefore, there is a possibility that completion of a shift delays and drivability deteriorates. On the other hand, in order to cancel the inertia torque, there is a well-known technique that is so-called engine torque reduction control for temporarily reducing engine torque during inertia phase.

However, in the technique described in JP 2000-97325 A, an engine is not incorporated in the equation of motion as a controlled object. That is, in the technique described in JP 2000-97325 A, the equation of motion is solved for a current engine torque. Therefore, in the shift model control described in JP 2000-97325 A, it is not possible to cancel inertia torque through engine torque reduction control instead of a temporal increase in hydraulic pressure of the released-side engagement device. At this time, it is possible to execute engine torque reduction control separately from shift model control. However, in this case, the overall shift model control collapses, and a solution needs to be derived from the equation of motion again, so eventually there is a possibility that completion of a shift delays, a shift shock increases and drivability deteriorates. On the other hand, if an engine torque is attempted to be uniquely determined as a control operation amount in shift model control, there will be three control operation amounts for two shift target values. Therefore, it is difficult to solve the equation of motion, and it is difficult to shift the automatic transmission by using shift model control.

SUMMARY OF THE INVENTION

The above-described problem is not known. When there are three control operation amounts for two shift target values, appropriately setting a constraint condition for solving the equation of motion has not been suggested yet so as to be compatible with any shift pattern (shift mode) of a power-on upshift, a power-off upshift, a power-on downshift and a power-off downshift with the use of a predetermined shift model. In contrast to this, according to the invention, a new technique for solving the equation of motion by appropriately setting the constraint condition is suggested (see the International Application (International Application No. PCT/JP2012/069408) filed by the applicant of the present application before and not published at the time of filing this application). In addition, the invention suggests a technique for further improving the related technique on the basis of the new technique.

The invention provides a shift control device and shift control method for a vehicle, which are able to carry out a desired shift of an automatic transmission with the use of a shift model even when there are three control operation amounts for two shift target values.

A first aspect of the invention provides a shift control device for a vehicle including an automatic transmission that has a plurality of engagement devices, the plurality of engagement devices transmitting rotation and torque between an input shaft that receives power from a driving force source and an output shaft that transmits power to a drive wheel, the automatic transmission being shifted by switching between engaged and released states of each of the engagement devices, the shift control device being configured to carry out a shift of the automatic transmission with the use of a predetermined shift model with which control operation amounts are determined to achieve shift target values. The shift control device includes an electronic control unit configured to carry out the shift of the automatic transmission with the use of the shift model by (i) setting the shift target values on the basis of two values that are a torque of a rotating member on the output shaft side and a speed variation amount of a rotating member on the input shaft side, (ii) setting the control operation amounts on the basis of three values that are a torque of the rotating member on the input shaft side, a torque capacity of an engaged one of the engagement devices during the shift and a torque capacity of a released one of the engagement devices during the shift, and (iii) setting torque shares of a transmission torque between the engaged one of the engagement devices and the released one of the engagement devices during the shift, the electronic control unit being configured to, at the time of a shift between gear speeds, which is carried out by releasing two of the engagement devices and engaging other two of the engagement devices, carry out the shift by carrying out a first shift and a second shift through an intermediate gear speed, the electronic control unit being configured to carry out the first shift from a pre-shift gear speed to the intermediate gear speed by releasing one of the engagement devices and engaging another one of the engagement devices and to carry out the second shift from the intermediate gear speed to a post-shift gear speed by releasing one of the engagement devices and engaging another one of the engagement devices. The torque shares are torque shares of a transmission torque between the engaged one of the engagement devices and the released one of the engagement devices during the shift when the transmission torque is converted to the torque of the rotating member on the input shaft side.

With this configuration, in a situation that, when the three control operation amounts need to be determined in order to achieve the two shift target values, it is not possible to determine those control operation amounts unless a constraint condition is set. For this reason, the torque shares of the transmission torque between the released one of the engagement devices and the engaged one of the engagement devices are set as the constraint condition. Therefore, it is suitable for controlling an exchange of torque between the released one of the engagement devices and the engaged one of the engagement devices (that is, shift progress degree), which is difficult in shift control, and it is possible to determine the three control operation amounts. In other words, in the case where any one of the control operation amounts is set to a predetermined value in order to determine the three control operation amounts, there are an infinite number of the predetermined values. For example, the any one of the control operation amounts is set to a predetermined value suitable for each shift pattern. In contrast to this, according to the invention, the torque shares that express an exchange of torque are set as the constraint condition, so it is possible to handle any shift pattern with the use of the predetermined shift model. Specifically, when only one of the torque capacity of the engaged-side engagement device and the torque capacity of the released-side engagement device is set as the constraint condition, there is a possibility that tie-up or racing of a rotating member may occur. However, by setting the torque shares suitable for controlling the shift progress degree as the constraint condition, occurrence of the tie-up or racing is suppressed, and, conversely, controllability of control for causing tie-up or racing to occur on purpose improves. In addition, when the torque of the rotating member on the input shaft side is set as the constraint condition, there is a possibility that it is not possible to execute control for temporarily varying the output torque of the driving force source. However, according to the invention, for example, it is possible to appropriately execute torque reduction control for temporarily reducing the output torque of the driving force source during inertia phase. In this way, according to the invention, even when there are three control operation amounts for two shift target values, it is possible to appropriately determine the three control operation amounts with the use of the shift model and then carry out a desired shift of the automatic transmission such that the two shift target values are achieved.

Incidentally, a shift in which two engagement devices are released and two engagement devices are engaged may be carried out depending on the type of shift of the automatic transmission (for example, a skip shift that is a shift between non-adjacent gear speeds). In such a case, the control operation amounts are five values, that is, the torque of the rotating member on the input shaft side, the torque capacities of the two engaged-side engagement devices and the torque capacities of the two released-side engagement devices, so it is not possible to solve the equation of motion only by adding the torque shares to the constraint condition, and it is not possible to carry out a desired shift of the automatic transmission with the use of the shift model. For the above inconvenience, in the first aspect, at the time of a shift between gear speeds, which is carried out by releasing two of the engagement devices and engaging other two of the engagement devices, the shift is carried out through the first shift and the second shift in each of which one of the engagement devices is released and another one of the engagement devices is engaged, so the three control operation amounts are used in each of the first shift and the second shift, with the result that it is possible to solve the equation of motion. Thus, according to the invention, it is possible to further appropriately carry out a desired shift of the automatic transmission with the use of the shift model.

Here, in the shift control device according to the above aspect, the electronic control unit may be configured to, during a transition of the first shift, reduce the torque capacity of the released one of the engagement devices in the second shift as compared to that before a start of the first shift. With this configuration, when an excessive amount of the torque capacity of the released-side engagement device in the second shift remains at the time of changing from the first shift to the second shift, the released-side engagement device in the second shift cannot quickly generate differential rotation, a variation in the rotation speed of the rotating member on the input shaft side stops, and a shift shock may occur. However, by reducing the torque capacity of the released-side engagement device in the second shift during a transition of the first shift, an excessive remainder of the torque capacity of the released-side engagement device in the second shift at the time of changing into the second shift is avoided, and it is possible to quickly generate the differential rotation of the released-side engagement device in the second shift, so a shift shock is suppressed.

In the shift control device according to the above aspect, the electronic control unit may be configured to calculate a required value of the torque capacity of the released one of the engagement devices in the second shift during a transition of the first shift by using an equation of motion of the automatic transmission, including the shift target values and the control operation amounts, corresponding to the second shift, and the electronic control unit may be configured to set the shift target values in the equation of motion corresponding to the second shift such that the released one of the engagement devices in the second shift has no differential rotation during a transition of the first shift. With this configuration, it is possible to calculate the required value of the torque capacity of the released-side engagement device in the second shift as a continuous value before and after changing into the second shift, and it is possible to smoothly generate the differential rotation of the released-side engagement device in the second shift. In addition, the released-side engagement device is caused not to generate the differential rotation in the second shift during a transition of the first shift. Therefore, it is possible to satisfy the precondition of the equation of motion corresponding to the first shift, that is, the differential rotation speed of the released-side engagement device in the second shift is set to zero during the first shift, and it is possible to keep the accuracy of the equation of motion corresponding to the first shift, so it is possible to accurately achieve desired shift target values.

In the shift control device according to the above aspect, the electronic control unit may be configured to change from the first shift to the second shift on the basis of at least one of a rotation speed of the rotating member on the input shaft side and a differential rotation speed between the engagement devices associated with the first shift. With this configuration, it is possible to change from the first shift to the second shift on the basis of how the torque capacities of the engagement devices act on the progress of shift, and it is possible to achieve the required values of the torque capacities of the engagement devices even at the time of a change of a direction in which the torque capacity that is generatable during a transition of the shift acts on the progress of shift. The rotation speed of the rotating member on the input shaft side and the differential rotation speed between the engagement devices associated with the first shift each may be actually measured or may be estimated on the basis of the equation of motion or the rotation speed of another rotating member. The timing at which a shift is changed from the first shift to the second shift does not always need to be determined on the basis of the rotation speed or the differential rotation speed, and may be determined through adaptation.

In the shift control device according to the above aspect, the electronic control unit may be configured to calculate the control operation amounts on the basis of the shift target values by using an equation of motion of the automatic transmission, including the shift target values and the control operation amounts, and a relationship that expresses the torque shares, as the shift model. With this configuration, it is possible to incorporate control associated with an exchange of torque between the released-side engagement device and the engaged-side engagement device, which is difficult in shift control, into the equation of motion, so it is possible to appropriately determine the three control operation amounts.

A second aspect of the invention provides a shift control method for a vehicle including an electronic control unit and an automatic transmission that has a plurality of engagement devices, the plurality of engagement devices transmitting rotation and torque between an input shaft that receives power from a driving force source and an output shaft that transmits power to a drive wheel, the automatic transmission being shifted by switching between engaged and released states of each of the engagement devices. The shift control method, executed by the electronic control unit, includes: carrying out a shift of the automatic transmission with the use of a predetermined shift model with which control operation amounts are determined to achieve shift target values; carrying out the shift of the automatic transmission with the use of the shift model by (i) setting the shift target values on the basis of two values that are a torque of a rotating member on the output shaft side and a speed variation amount of a rotating member on the input shaft side, (ii) setting the control operation amounts on the basis of three values that are a torque of the rotating member on the input shaft side, a torque capacity of an engaged one of the engagement devices during the shift and a torque capacity of a released one of the engagement devices during the shift, and (iii) setting torque shares of a transmission torque between the engaged one of the engagement devices and the released one of the engagement devices during the shift; and, at the time of a shift between gear speeds, which is carried out by releasing two of the engagement devices and engaging other two of the engagement devices, carrying out the shift by carrying out a first shift and a second shift through an intermediate gear speed, the first shift being carried out from a pre-shift gear speed to the intermediate gear speed by releasing one of the engagement devices and engaging another one of the engagement devices, the second shift being carried out from the intermediate gear speed to a post-shift gear speed by releasing one of the engagement devices and engaging another one of the engagement devices.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

According to the invention, the vehicle, for example, may transmit power of the driving force source to the drive wheel via a power transmission device, such as the automatic transmission. In addition, the automatic transmission may be a step-gear automatic transmission in which a plurality of speeds (gear speeds) respectively having different speed ratios (gear ratios) are alternatively established by switching between engaged and released states of each of predetermined engagement devices. For example, the step-gear automatic transmission is a known planetary gear-type automatic transmission. Engagement devices, such as multi-disc or single-disc clutches and brakes that are engaged by corresponding hydraulic actuators and a hand brake, are widely used as engagement devices in the planetary gear-type automatic transmission. The vehicle, for example, may include a hydraulic control circuit that supplies hydraulic pressures to the hydraulic actuators of the plurality of engagement devices, respectively. The hydraulic control circuit, for example, may include linear solenoid valves, on-off solenoid valves, and the like, and supplies output hydraulic pressures of those solenoid valves respectively to the hydraulic actuators of the engagement devices directly or indirectly via a shift control valve, or the like. The above "supplying a hydraulic pressure" means "applying a hydraulic pressure" or "supplying hydraulic fluid controlled to a certain hydraulic pressure".

An engine, such as a gasoline engine and a diesel engine, may be used as the driving force source. Alternatively, a prime mover, such as an electric motor, may be used solely or in combination with the engine as the driving force source.

Hereinafter, embodiments of the invention will be described with reference to the accompanying drawings.

Figures 1, 2:
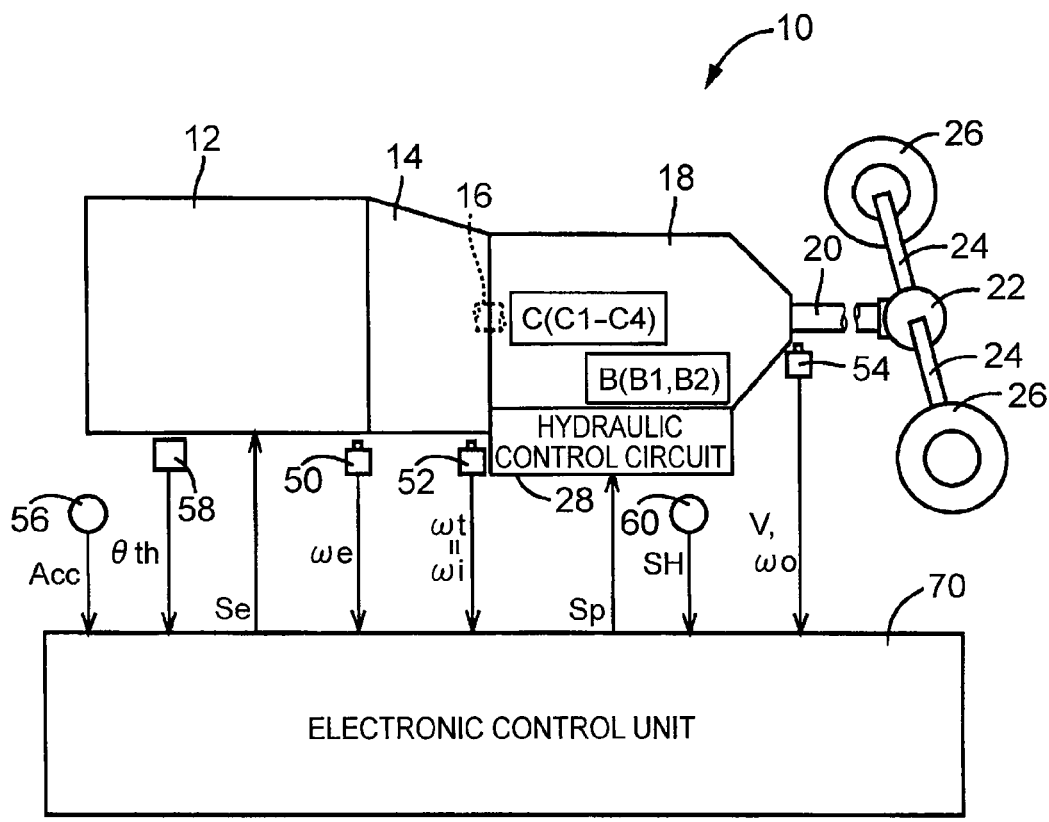
FIG. 1 is a view that illustrates the schematic configuration of a power transmission path in a vehicle to which the invention is applied and is a view that illustrates a relevant portion of a control system provided in the vehicle.
FIG. 2 is an operation table (engagement table) that illustrates the relationship between a shift operation of an automatic transmission and a combination of operated engagement devices used in the shift operation.

FIG. 1 is a view that illustrates the schematic configuration of a power transmission path from an engine 12 mounted on a vehicle 10, to which the invention is applied, to drive wheels 26, and is a view that illustrates a relevant portion of a control system provided in the vehicle 10. In FIG. 1, power generated by the engine 12 that serves as a driving force source is caused to pass through a torque converter 14 and input from an input shaft 16 to the automatic transmission 18, and then transmitted from an output shaft 20 of the automatic transmission 18 to the right and left drive wheels 26 sequentially via a differential gear unit (differential gear) 22, a pair of axles (drive shafts) 24, and the like.

The automatic transmission 18 is a known planetary gear-type automatic transmission that includes a single set or multiple sets of planetary gear units and a plurality of engagement devices (engagement elements) in a transmission case. A plurality of gear speeds are alternatively established by the engagement devices in the automatic transmission 18. The transmission case serves as a non-rotating member connected to a vehicle body. For example, the automatic transmission 18 is a step-gear transmission that carries out a so-called clutch-to-clutch shift and in which a shift is carried out by engaging one of the plurality of engagement devices and releasing another one of the plurality of engagement devices (that is, switching between engaged and released states of each of any two of the engagement devices). The plurality of engagement devices each are a hydraulic friction engagement device that transmits rotation and torque between the input shaft 16 that receives power from the engine 12 and the output shaft 20 that transmits power to the drive wheels 26. The input shaft 16 is an input shaft of the automatic transmission 18, and is also a turbine shaft that is driven for rotation by a turbine impeller of the torque converter 14.

The hydraulic friction engagement devices are clutches C and brakes B. Each of the friction engagement devices is controlled to be engaged or released by a hydraulic control circuit 28. Each of the friction engagement devices selectively couples members on both sides thereof by varying its torque capacity, that is, engagement force, through a pressure that is regulated by a corresponding one of the solenoid valves, and the like, in the hydraulic control circuit 28. Here, the torque capacity (hereinafter, referred to as clutch torque) of each engagement device is, for example, determined on the basis of the friction coefficient of a friction material of the engagement device and an engagement hydraulic pressure that presses a friction plate. In order to transmit torque (for example, transmission input torque Ti, that is, turbine torque Tt, input to the input shaft 16) between the input shaft 16 and the output shaft 20 without a slip of each engagement device (that is, without occurrence of a differential rotation speed in each engagement device), a torque capacity that allows a transmission torque amount shared between the engagement devices for that torque (that is, a torque shared between the engagement devices) is required. However, at the torque capacity that allows the transmission torque amount, the transmission torque does not increase any more even when the torque capacity is increased. In the present embodiment, for the sake of convenience, clutch torque and engagement hydraulic pressure may be handled as being synonymous with each other.

As gear speeds in the automatic transmission 18, for example, as shown in the engagement operation table of FIG. 2, each of forward eight gear speeds is established on the basis of a driver's accelerator operation, a vehicle speed V, and the like, through engagement and release control over each of the clutches C (C1, C2, C3, C4) and the brakes B (B1, B2). For example, a low vehicle speed-side gear speed (low gear speed, for example, first gear speed 1st) is established by engaging the clutch C1 and the brake B2, and a high vehicle speed-side gear speed (high gear speed, for example, second gear speed 2nd) is established by engaging the clutch C1 and the brake B1. Thus, at the time of a shift between the low gear speed and the high gear speed, one of the brake B2 and the brake B1 is engaged, and the other one of the brake B2 and the brake B1 is released. In the present embodiment, between the engagement devices, one of which is engaged and the other one of which is released during shifting, the engagement device associated with establishment of the low gear speed (for example, the brake B2) is termed low gear speed engagement device, and the engagement device associated with establishment of the high gear speed (for example, the brake B1) is termed high gear speed engagement device. The low gear speed engagement device serves as a released-side engagement device (hereinafter, referred to as released-side clutch) at the time of an upshift from the low gear speed to the high gear speed, and serves as an engaged-side engagement device (hereinafter, referred to as engaged-side clutch) at the time of a downshift from the high gear speed to the low gear speed. On the other hand, the high gear speed engagement device serves as an engaged-side clutch at the time of the upshift, and serves as a released-side clutch at the time of the downshift.

Referring back to FIG. 1, the vehicle 10 includes an electronic control unit 70 that includes a shift control unit associated with, for example, shift control over the automatic transmission 18, and the like. The electronic control unit 70 is configured to include a so-called microcomputer that includes, for example, a CPU, a RAM, a ROM, an input/output interface, and the like. The CPU executes various controls over the vehicle 10 by carrying out signal processing in accordance with a program stored in the ROM in advance while utilizing a temporary storage function of the RAM. For example, the electronic control unit 70 is configured to execute output control over the engine 12, shift control over the automatic transmission 18, and the like, and is formed separately in a unit for engine control, a unit for hydraulic pressure control (shift control), and the like, as needed. Various signals detected by various sensors are supplied to the electronic control unit 70. The various sensors, for example, include rotation speed sensors 50, 52, 54, an accelerator operation amount sensor 56, a throttle opening degree sensor 58, a shift sensor 60, and the like. The various signals, for example, include an engine rotation speed we that indicates the rotation speed of the engine 12, a turbine rotation speed wt, that is, a transmission input rotation speed $\omega i$, that indicates the rotation speed of the input shaft 16, a transmission output rotation speed $\omega o$ that indicates the rotation speed of the output shaft 20, which corresponds to a vehicle speed V, an accelerator operation amount Acc that indicates a driver's required amount of driving force (driving torque) of the vehicle 10, a throttle valve opening degree $\theta th$, a shift operation SH through a shift lever or a paddle switch, and the like. In addition, for example, an engine output control command signal Se, a hydraulic pressure command signal Sp, and the like, are output from the electronic control unit 70. The engine output control command signal Se is used to execute output control over the engine 12. The hydraulic pressure command signal Sp is used to operate the hydraulic control circuit 28 that controls the hydraulic actuators of the automatic transmission 18.

Figure 3:
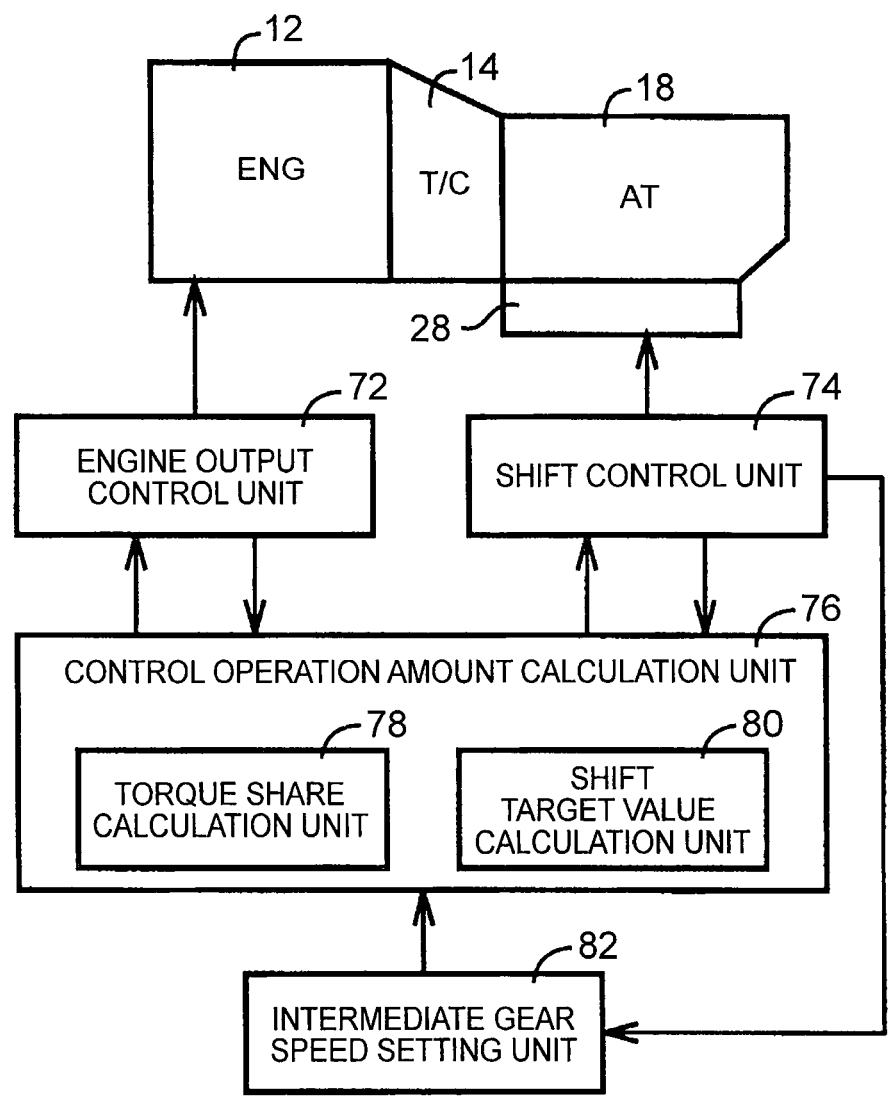
FIG. 3 is a functional block diagram that illustrates a relevant portion of control functions of an electronic control unit.

FIG. 3 is a functional block diagram that illustrates a relevant portion of control functions of the electronic control unit 70. In FIG. 3, engine output control means, that is, an engine output control unit 72, not only executes open/close control over an electronic throttle valve with the use of a throttle actuator for throttle control but also controls a fuel injection amount from a fuel injection device for fuel injection amount control and outputs the engine output control command signal Se that controls an ignition device, such as an igniter, for ignition timing control such that, for example, a required engine torque Te (hereinafter, required engine torque Tedem) is obtained. The engine output control unit 72, for example, calculates a required driving force Fdem on the basis of an actual accelerator operation amount Acc and an actual vehicle speed V from a prestored correlation (not shown) (driving force map) between a vehicle speed V and a required driving force Fdem by using the accelerator operation amount Acc as a parameter. Then, the engine output control unit 72, for example, calculates the required engine torque Tedem, by which the required driving force Fdem is obtained, on the basis of a tire effective radius of each drive wheel 26, a gear ratio ($=\omega i/\omega o$) at the current gear speed of the automatic transmission 18, a final reduction ratio in the power transmission path on the drive wheel 26 side of the output shaft 20 and a torque ratio t of the torque converter 14. The torque ratio t of the torque converter 14 is, for example, calculated on the basis of an actual speed ratio e from a prestored known correlation (the operation characteristic chart of the torque converter 14) between a speed ratio ($=$turbine rotation speed $\omega t$/pump rotation speed $\omega p$ (engine rotation speed $\omega e$)) and a torque ratio t, efficiency and capacity coefficient.

Shift control means, that is, a shift control unit 74, executes shift control over the automatic transmission 18. Specifically, the shift control unit 74 executes shift determination on the basis of a vehicle state indicated by an actual vehicle speed V and an actual accelerator operation amount Acc from a prestored known correlation (shift map, shift line map) by using the vehicle speed V and the accelerator operation amount Acc as variables. Then, when the shift control unit 74 has determined to shift the automatic transmission 18, the shift control unit 74 executes automatic shift control over the automatic transmission 18 such that a gear speed into which the automatic transmission 18 should be shifted is obtained. For example, the shift control unit 74 outputs the hydraulic pressure command signal Sp for engaging and/or releasing the engagement devices associated with the shift of the automatic transmission 18 to the hydraulic control circuit 28 such that the determined gear speed is achieved. The hydraulic pressure command signal Sp includes, for example, a hydraulic pressure command value for obtaining the torque capacity of the released-side clutch (hereinafter, referred to as released-side clutch torque) and a hydraulic pressure command value for obtaining the torque capacity of the engaged-side clutch (hereinafter, referred to as engaged-side clutch torque).

Here, shift control may be executed in accordance with a method of shifting the automatic transmission 18 by, for example, determining the torque capacities (or hydraulic pressure command values) during shifting from a control map that is predetermined through adaptation while evaluations are carried out in an actual vehicle whether a shift shock, a shift duration, and the like, are appropriate. In such a method that uses the control map, it is required to create individually different control maps on the basis of which type of shift is carried out. Therefore, as the number of gear speeds of the automatic transmission 18 increases, larger amounts of effort, and the like, are required for the above adaptation work. The types of shift are, for example, various shift manners expressed by combinations of various shift patterns (shift modes), that is, a power-on upshift, a power-off upshift, a power-on downshift and a power-off downshift, and various shifts between gear speeds, such as a shift between first speed and second speed and a shift between second speed and third speed. More specifically, the types of shift are expressed by a third to second power-on downshift, a second to first power-on downshift, and the like.

In the present embodiment, instead of the above-described method that uses the control map, a method of shifting the automatic transmission 18 with the use of a predetermined shift model that determines control operation amounts for achieving shift target values is employed as shift control. The shift target values are target values of elements (for example, shift duration, driving force, and the like) that determine a desired variation mode during shifting. The control operation amounts are required values of elements (engine torque, clutch torque, and the like) that are operated for controlled objects.

Hereinafter, shift control over the automatic transmission 18 with the use of the shift model will be described in detail. The equation of motion during shifting of the automatic transmission 18 is expressed by the following mathematical expression (1) and mathematical expression (2). The mathematical expression (1) and the mathematical expression (2) are derived from the equation of motion of each of mutually coupled rotating elements that constitute the automatic transmission 18 and a relational expression in the planetary gear unit that constitutes the automatic transmission 18. The equation of motion of each of the rotating elements is the equation of motion that defines a torque, expressed by the product of inertia and a time rate of change in rotation speed in the rotating element, by using torques that respectively act on three members (sun gear, carrier, ring gear) of the planetary gear unit and one of members on both sides of each engagement device, associated with the rotating element. In addition, the relational expression in the planetary gear unit is a relational expression that defines the correlation in torque and the correlation in time rate of change in rotation speed among the three members of the planetary gear unit by using the gear ratio of the planetary gear unit (=the number of teeth of the sun gear/the number of teeth of the ring gear). In the mathematical expression (1) and the mathematical expression (2), $d\omega t/dt$ denotes a time derivative, that is, a time rate of change of the turbine rotation speed $\omega t$ (that is, the transmission input rotation speed $\omega i$), and denotes an angular acceleration of the input shaft 16 (hereinafter, input shaft angular acceleration) as a variation in the speed of the input shaft 16-side rotating member (in the drawings and the mathematical expressions, the time rate of change is indicated with a dot, and the same applies to the following description). $d\omega o/dt$ denotes a time rate of change in the transmission output rotation speed $\omega o$, and denotes an output shaft angular acceleration. Tt denotes a turbine torque, that is, a transmission input torque Ti, that is a torque of the input shaft 16 as a torque of the input shaft 16-side rotating member. The turbine torque Tt is equivalent to an engine torque Te ($=Tt/t$) when the torque ratio t of the torque converter 14 is taken into consideration. To denotes a transmission output torque that is a torque of the output shaft 20 as a torque of the output shaft 20-side rotating member. Tcapl is an engaged-side clutch torque, becomes a high gear speed-side clutch torque at the time of an upshift, and becomes a low gear speed-side clutch torque at the time of a downshift. Tcdrn is a released-side clutch torque, becomes a low gear speed-side clutch torque at the time of an upshift, and becomes a high gear speed-side clutch torque at the time of a downshift. Constants a1, a2, b1, b2, c1, c2, d1, d2 are used at the time of deriving the mathematical expression (1) and the mathematical expression (2), and are set in design on the basis of inertia in each rotating element and the gear ratio of the planetary gear unit (specific numeric values vary on each shift pattern). Specific numeric values of the constants vary depending on, for example, each type of shift (for example, a shift pattern or a shift between gear speeds). Thus, the above equation of motion is one predetermined equation; however, an equation of motion corresponding to each type of shift having different constants for each type of shift is used to shift the automatic transmission 18.

$$\dot{\omega}t = a1 \cdot Tt + b1 \cdot Tcapl + c1 \cdot Tcdrn + d1 \cdot \dot{\omega}o \quad (1)$$

$$To = a2 \cdot Tt + b2 \cdot Tcapl + c2 \cdot Tcdrn + d2 \cdot \dot{\omega}o \quad (2)$$

The mathematical expression (1) and the mathematical expression (2) constitute the equation of motion of gear train of the automatic transmission 18, which formulates the correlation between the shift target values and the control operation amounts. Here, the shift target values are able to express a target value of the shift duration and a target value of the driving force and are allowed to be used in the equation of motion of gear train. In the present embodiment, the input shaft angular acceleration $d\omega t/dt$ is used as an example of the element that is able to express the shift duration. In addition, the transmission output torque To is used as an example of the element that is able to express the driving force. That is, in the present embodiment, the shift target values are set on the basis of two values, that is, the input shaft angular acceleration $d\omega t/dt$ and the transmission output torque To. On the other hand, in the present embodiment, the control operation amounts for achieving those shift target values are set on the basis of three values, that is, the turbine torque Tt (which is equivalent to the engine torque Te), the engaged-side clutch torque Tcapl and the released-side clutch torque Tcdrn. Therefore, the equation of motion is formed of two mathematical expressions, that is, the mathematical expression (1) and the mathematical expression (2); whereas there are three control operation amounts, so it is not possible to uniquely solve the control operation amounts that achieve the two shift target values. Therefore, it is not possible to shift the automatic transmission 18 in a desired manner with the use of the shift model such that the two shift target values are achieved. The output shaft angular acceleration $d\omega o/dt$ is calculated from the transmission output rotation speed wo that is a detected value of the rotation speed sensor 54.

Incidentally, it is presumable that it is possible to uniquely solve the control operation amounts by adding a constraint condition to the equation of motion expressed by the mathematical expression (1) and the mathematical expression (2). Here, it is difficult to control an exchange of torque between the released-side clutch and the engaged-side clutch (that is, shift progress degree) in shift control over the automatic transmission 18. On the other hand, in the case where any one of the control operation amounts is set to a predetermined value in order to determine the three control operation amounts, there are an infinite number of ways of setting, such as the any one of the control operation amounts is set to a predetermined value in accordance with each shift pattern. As for the predetermined value, for example, if only one of the released-side clutch torque Tcdrn and the engaged-side clutch torque Tcapl is set as the constraint condition, tie-up or racing may easily occur during shifting or controllability of control for causing tie-up or racing to occur during shifting on purpose may decrease. Alternatively, for example, if the variation mode of the engine torque is set as the constraint condition, it may be not possible to execute engine torque reduction control such that the engine torque is temporarily varied during inertia phase. In the present embodiment, it is found that torque shares of transmission torque between the released-side clutch and the engaged-side clutch are set as the above-described constraint condition. The torque shares of transmission torque are suitable for expressing or controlling an exchange of torque during shifting, and are compatible with any shift pattern. That is, it is found that the torque shares of transmission torque are set as the above-described constraint condition. The torque shares of transmission torque allow an exchange of torque during shifting to be incorporated into the equation of motion, and allow the control operation amounts to be uniquely solved. The torque shares are the rates of transmission torque shared between the released-side clutch and the engaged-side clutch during shifting of the automatic transmission 18 with respect to an input shaft total transmission torque when the total transmission torque is, for example, converted to the torque of the input shaft 16 (input shaft total transmission torque). In the present embodiment, the torque share of the engaged-side clutch is denoted by "xapl", the torque share of the released-side clutch is denoted by "xdrn", and the torque shares are respectively defined by the following mathematical expression (3) and the following mathematical expression (4) by using a torque share x (for example, 0≤x≤1) that varies in time sequence so as to reflect an exchange of torque during shifting.

$$xapl = x \quad (3)$$

$$xdrn = 1-x \quad (4)$$

The relational expression between the engaged-side clutch torque Tcapl and the released-side clutch torque Tcdrn may be defined by using "x" (=xapl) and "1−x" (=xdrn) on the basis of "Tcapl" and "Tcdrn", which are converted as torques of the input shaft 16, and the mathematical expression (3) and the mathematical expression (4). From the mathematical expression (1), the mathematical expression (2) and the relational expression between "Tcapl" and "Tcdrn", relational expressions for calculating the turbine torque Tt, the engaged-side clutch torque Tcapl and the released-side clutch torque Tcdrn that are control operation amounts are derived. The turbine torque Tt (equivalent to the engine torque Te) is expressed by a relational expression by using "x" (=xapl), "1−x" (=xdrn), the input shaft angular acceleration dωt/dt, the transmission output torque To, and the like. Similarly, the engaged-side clutch torque Tcapl is expressed by a relational expression by using "x" (=xapl), the input shaft angular acceleration dωt/dt, the transmission output torque To, and the like. Similarly, the released-side clutch torque Tcdrn is expressed by a relational expression by using "1−x" (=xdrn), the input shaft angular acceleration dωt/dt, the transmission output torque To, and the like. That is, the shift model according to the present embodiment is to calculate the control operation amounts on the basis of the shift target values by using the equation of motion (the above-described mathematical expressions (1), (2)) of the automatic transmission 18, including the shift target values and the control operation amounts, and the relationships (the above-described mathematical expressions (3), (4)) that respectively express the torque shares. In this way, in the present embodiment, by adding the constraint condition set for the torque share x to the mathematical expressions (1), (2), the automatic transmission 18 is shifted with the use of the shift model. Thus, even when there are three control operation amounts for two shift target values, it is possible to appropriately determine the three control operation amounts with the use of the above-described shift model. The shift model is a predetermined one, and the equations of motion of gear train having different constants for each type of shift (for example, a shift pattern or a shift between gear speeds) as described above, so the shift model corresponding to each type of shift is used to shift the automatic transmission 18.

Here, in shift control over the automatic transmission 18, there are various shift patterns, such as a power-on upshift, a power-off upshift, a power-on downshift and a power-off downshift. Therefore, it is desirable to set torque shares in accordance with each shift pattern. For example, in the present embodiment, in order to cause a shift to appropriately progress in accordance with the shift pattern, the timing at which the torque shares are varied is changed on the basis of the shift pattern (that is, the timing at which torque is exchanged between the released-side clutch and the engaged-side clutch is changed on the basis of the shift pattern). Hereinafter, setting of the torque shares in accordance with each shift pattern will be described in detail.

Figure 4A:
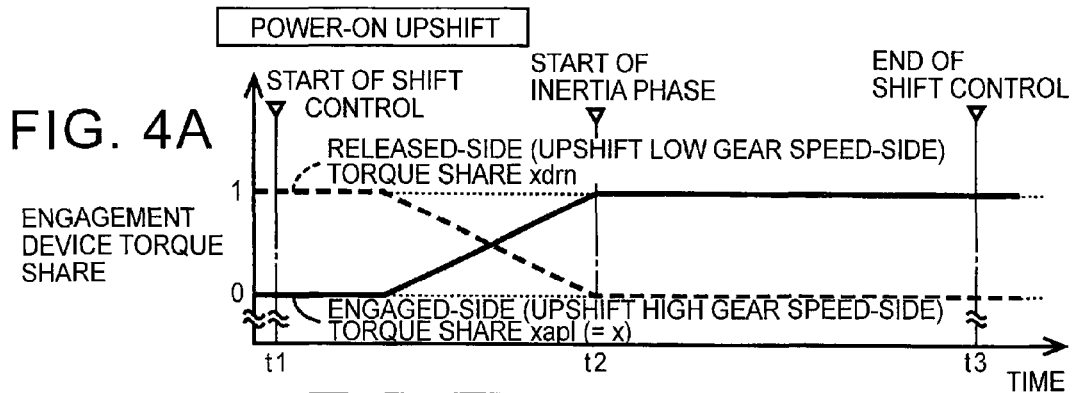
FIG. 4A is a view that shows an example of timing at which torque shares are varied, which is predetermined for each shift pattern, and, in this case, a power-on upshift.
Figure 4B:
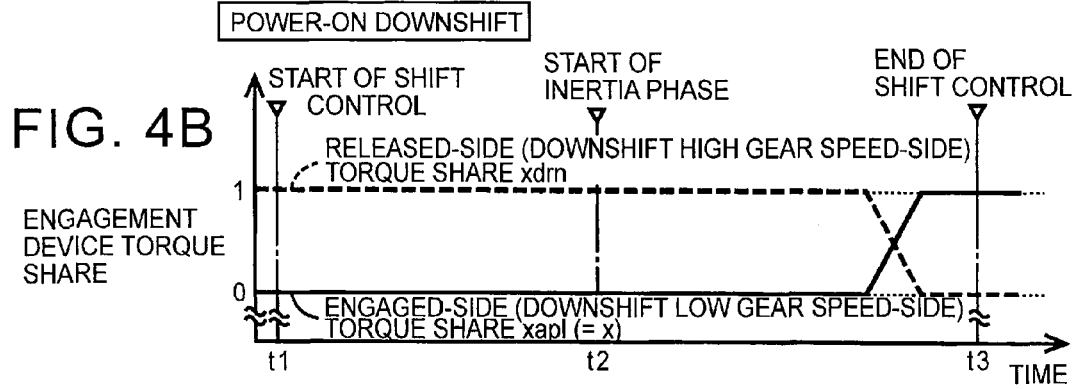
FIG. 4B is a view that shows an example of timing at which torque shares are varied, which is predetermined for each shift pattern, and, in this case, a power-on downshift.
Figure 4C:
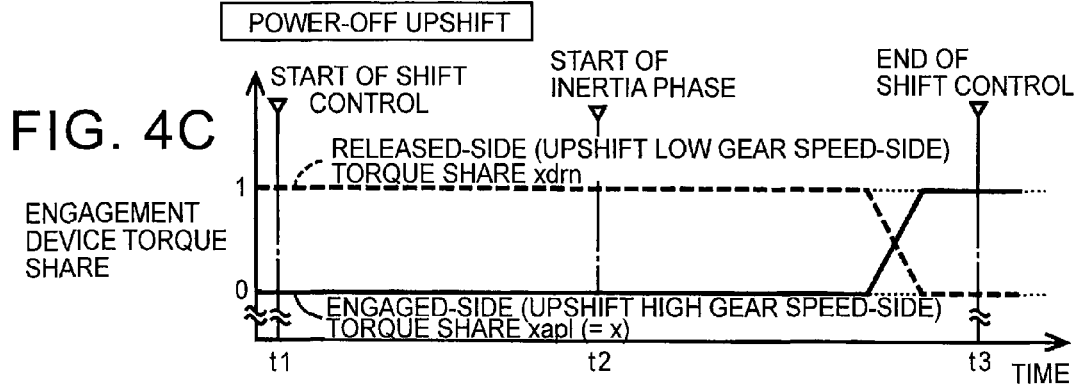
FIG. 4C is a view that shows an example of timing at which torque shares are varied, which is predetermined for each shift pattern, and, in this case, a power-off upshift.
Figure 4D:
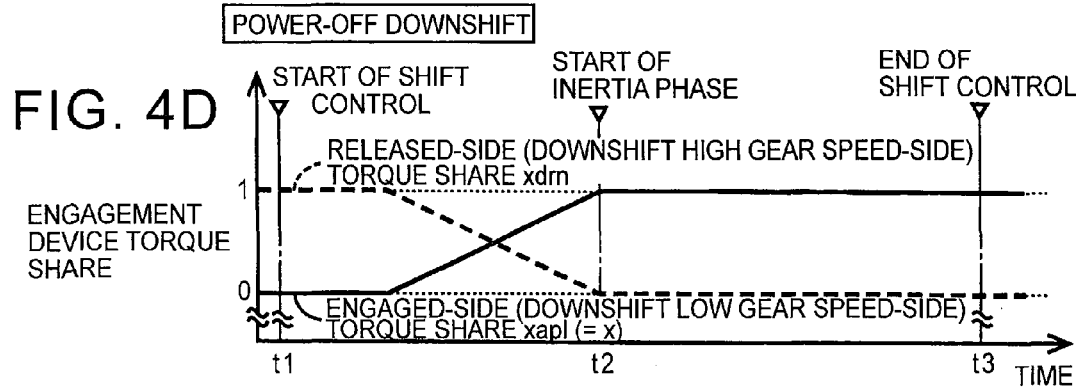
FIG. 4D is a view that shows an example of timing at which torque shares are varied, which is predetermined for each shift pattern, and, in this case, a power-off downshift.

In a power-on upshift or a power-off downshift, a direction in which the turbine rotation speed ωt (that is, the transmission input rotation speed ωi) is varied by the engine torque Te (a positive torque at the time of power-on or a negative torque (engine friction torque) at the time of power off) differs from a direction in which the turbine rotation speed ωt varies as a result of the shift (direction in which the turbine rotation speed ωt is varied as a result of the shift). That is, in a power-on upshift or a power-off downshift, it is not possible to cause the shift to spontaneously progress by using the engine torque Te. Thus, it is not possible to cause the shift to progress only by decreasing the absolute value of the released-side clutch torque Tcdrn (that is, only by gradually releasing the released-side clutch) without changing the torque shares, so it is required to vary the turbine rotation speed ωt in the variation direction as a result of the shift with the use of the engaged-side clutch. In the case where the shift pattern is a power-on upshift or a power-off downshift, as shown in FIG. 4A and FIG. 4D, in order to cause the shift to appropriately progress, the timing at which the torque shares are changed is set to timing before the start of inertia phase (that is, torque is exchanged between the released-side clutch and the engaged-side clutch before the start of inertia phase).

On the other hand, in a power-off upshift or a power-on downshift, the turbine rotation speed ωt is varied by the engine torque Te in the variation direction as a result of the shift. That is, in a power-off upshift or a power-on downshift, it is possible to cause the shift to spontaneously progress by using the engine torque Te. Thus, it is possible to cause the shift to progress only by decreasing the absolute value of the released-side clutch torque Tcdrn without changing the torque shares, so it is not required to vary the turbine rotation speed ωt in the variation direction as a result of the shift with the use of the engaged-side clutch. In a power-off upshift or a power-on downshift, if the shift is caused to progress with the use of the engaged-side clutch, inertia torque may increase and, as a result, a shift shock may deteriorate on the contrary. Therefore, in the case where the shift pattern is a power-off upshift or a power-on downshift, as shown in FIG. 4C and FIG. 4B, the timing at which the torque shares are changed is set to the end of inertia phase in order to cause the shift to appropriately progress. That is, in the case of a power-off upshift or a power-on downshift, in order to achieve a smooth shift in which a shift shock is suppressed, after the shift is caused to progress only by releasing the released-side clutch in accordance with the engine torque Te, the turbine rotation speed ωt is adjusted to post-shift synchronous rotation with the use of the engaged-side clutch by exchanging torque between the released-side clutch and the engaged-side clutch at the end of inertia phase. Here, the end of inertia phase is, for example, timing at which the turbine rotation speed ωt is substantially close to post-shift synchronous rotation that indicates that the inertia phase has been almost completed. That is, the end of inertia phase is the timing close to the end of inertia phase. After inertia phase is started and is caused to further progress by the engine torque Te and releasing of the released-side clutch, the engaged-side clutch just needs to be controlled to gradually engage only at the point at which the turbine rotation speed ωn is synchronized with the post-shift rotation speed at the end of inertia phase even when the engaged-side clutch is not caused to gradually engage. When it is possible to cause inertia phase to progress and to be completed by the engine torque Te and releasing of the released-side clutch, the end of inertia phase may be set to timing after the end of inertia phase.

More specifically, in FIG. 2, the shift control unit 74 determines whether the automatic transmission 18 is being shifted on the basis of, for example, whether a shift determined to be carried out has not been finished yet.

Control operation amount calculation means, that is, a control operation amount calculation unit 76, calculates the control operation amounts on the basis of the shift target values with the use of the shift model when the shift control unit 74 has determined that the automatic transmission 18 is being shifted. Specifically, the control operation amount calculation unit 76 includes torque share calculation means, that is, a torque share calculation unit 78, and shift target value calculation means, that is, a shift target value calculation unit 80.

The torque share calculation unit 78, for example, calculates the torque share x on the basis of an elapsed time from the start of variation (or the start of shift control, the last calculation timing) from a correlation (shift progress degree map) in which a mode (for example, a slope, or the like) for changing the torque share x is predetermined. The torque share calculation unit 78 calculates the torque share xapl of the engaged-side clutch and the torque share xdrn of the released-side clutch on the basis of the calculated torque share x from the mathematical expression (3) and the mathematical expression (4). The shift progress degree map is, for example, predetermined for each type of shift (a shift pattern or a shift between gear speeds). In addition, an initial value of the torque share x is set to "0".

The shift target value calculation unit 80, for example, calculates a target value of the input shaft angular acceleration dωt/dt during inertia phase on the basis of an elapsed time from the start of inertia phase (or the last calculation timing) from a correlation (input shaft angular acceleration variation map) in which a mode for varying the input shaft angular acceleration dωt/dt is predetermined such that a variation in the turbine rotation speed ωt (=transmission input rotation speed ωi) during inertia phase becomes a predetermined variation that achieves a suppressed shift shock and a shift duration. In addition, the shift target value calculation unit 80, for example, other than during inertia phase, calculates a target value of the input shaft angular acceleration dωt/dt on the basis of a variation in the turbine rotation speed ωt (=transmission input rotation speed ωi). In addition, the shift target value calculation unit 80, for example, calculates a target value of the transmission output torque To on the basis of the required driving force Fdem calculated by the engine output control unit 72 and an elapsed time from the start of shift control (or the last calculation timing) from a correlation (transmission output torque variation map) in which a mode for varying the transmission output torque To is predetermined. The input shaft angular acceleration variation map and the transmission output torque variation map are, for example, predetermined for each type of shift (a shift pattern or a shift between gear speeds).

The control operation amount calculation unit 76 calculates respective required values of the turbine torque Tt (equivalent to the engine torque Te), engaged-side clutch torque Tcapl and released-side clutch torque Tcdrn as the control operation amounts on the basis of the torque shares (x, xapl, xdrn) of the engagement devices, calculated by the torque share calculation unit 78, and the shift target values (target values of dωt/dt, To) calculated by the shift target value calculation unit 80 from the relational expressions for calculating the control operation amounts.

The engine output control unit 72 outputs the engine output control command signal Se such that the required value of the turbine torque Tt, calculated by the control operation amount calculation unit 76, is obtained. The shift control unit 74 outputs the hydraulic pressure command signal (for example, clutch pressure command value) Sp for obtaining the required values of the engaged-side clutch torque Tcapl and released-side clutch torque Tcdrn, calculated by the control operation amount calculation unit 76, to the hydraulic control circuit 28 such that the determined gear speed of the automatic transmission 18 is achieved.

Incidentally, as in the case of a shift between the third gear speed and the eighth gear speed and a shift between the fourth gear speed and the seventh gear speed, a shift to release the two engagement devices and engage the two engagement devices may be carried out. The equation of motion during shifting of the automatic transmission 18 in this case is expressed by the following mathematical expression (5) and mathematical expression (6). The mathematical expression (5) and the mathematical expression (6) are similarly derived as in the case of the mathematical expression (1) and the mathematical expression (2). In the mathematical expression (5) and the mathematical expression (6), Tcapl1 and Tcapl2 both are engaged-side clutch torques, and Tcdrn1 and Tcdrn2 both are released-side clutch torques. Thus, in the shift in which two elements are released and two elements are engaged, there are five control operation amounts, that is, the turbine torque Tt, the two engaged-side clutch torques Tcapl1, Tcapl2 and the two released-side clutch torques Tcdrn1, Tcdrn2. Therefore, the equation of motion of gear train is not uniquely solved only by adding a torque share x1 between the engaged-side clutch torque Tcapl1 and the released-side clutch torque Tcdrn1 to the constraint condition.

$$\dot{\omega}t = a1 \cdot Tt + b1 \cdot Tcapl1 + c1 \cdot Tcapl2 + d1 \cdot Tcdrn1 + e1 \cdot Tcdrn2 + f1 \cdot \omega o \qquad (5)$$

$$To = a2 \cdot Tt + b2 \cdot Tcapl1 + c2 \cdot Tcapl2 + d2 \cdot Tcdrn1 + e2 \cdot Tcdrn2 + f2 \cdot \omega o \qquad (6)$$

In the present embodiment, at the time of a shift in which two elements are released and two elements are engaged, the electronic control unit 70 carries out the shift via an intermediate gear speed. A first shift between a pre-shift gear speed and the intermediate gear speed and a second shift between the intermediate gear speed and a post-shift gear speed each are carried out by releasing one engagement device and engaging one engagement device. That is, at the time of a shift in which two elements are release and two elements are engaged, the shift is regarded as a multiple shift. In the multiple shift, the intermediate gear speed is set such that a first shift from a pre-shift gear speed is carried out by releasing one element and engaging one element and a second shift from the intermediate gear speed to a post-shift gear speed is carried out by releasing one element and engaging one element, and the first shift and the second shift are sequentially carried out.

Specifically, the equation of motion (the mathematical expressions (5), (6)) during a shift in which two elements are released and two elements are engaged is regarded as the equation of motion (the next mathematical expressions (7), (8)) during a first shift and the equation of motion (the next mathematical expressions (9), (10)) during a second shift. The mathematical expressions (7), (9) and the mathematical expressions (8), (10) are similarly derived as in the case of the mathematical expression (1) and the mathematical expression (2). In the mathematical expressions (7), (8), Tcapl1 is the torque capacity of the engaged-side clutch (first-shift engaged-side clutch) in the first shift (first-shift engaged-side clutch torque), and Tcdrn1 is the torque capacity of the released-side clutch (first-shift released-side clutch) in the first shift (first-shift released-side clutch torque). In the mathematical expressions (9), (10), Tcapl2 is the torque capacity of the engaged-side clutch (second-shift engaged-side clutch) in the second shift (second-shift engaged-side clutch torque), and Tcdrn2 is the torque capacity of the released-side clutch (second-shift released-side clutch) in the second shift (second-shift released-side clutch torque). As in the case of the mathematical expressions (3), (4), the torque shares (x1, xapl1, xdrn1) between the first-shift engaged-side clutch and the first-shift released-side clutch are set by the equation of motion (the next mathematical expressions (7), (8)) during the first shift, and the torque shares (x2, xapl2, xdrn2) between the second-shift engaged-side clutch and the second-shift released-side clutch are set by the equation of motion (the next mathematical expressions (9), (10)) during the second shift. Thus, it is possible to uniquely solve the equation of motion of gear train in each shift for the control operation amounts, with the result that it is possible to appropriately carry out the shift, in which two elements are released and two elements are engaged, with the use of the shift model.

$$\dot{\omega}t = a1 \cdot Tt + b1 \cdot Tcapl1 + c1 \cdot Tcdrn1 + d1 \cdot \dot{\omega}o \qquad (7)$$

$$To = a2 \cdot Tt + b2 \cdot Tcapl1 + c2 \cdot Tcdrn1 + d2 \cdot \dot{\omega}o \qquad (8)$$

$$\dot{\omega}t = a1 \cdot Tt + b1 \cdot Tcapl2 + c1 \cdot Tcdrn2 + d1 \cdot \dot{\omega}o \qquad (9)$$

$$To = a2 \cdot Tt + b2 \cdot Tcapl2 + c2 \cdot Tcdrn2 + d2 \cdot \dot{\omega}o \qquad (10)$$

The engagement pressure of the second-shift released-side clutch not associated with the first shift is, for example, kept at the maximum engagement pressure such that the second-shift released-side clutch is kept engaged during the first shift. Therefore, the second-shift released-side clutch torque excessively remains at the time of changing from the first shift to the second shift, the second-shift released-side clutch cannot quickly generate differential rotation, and a variation in the transmission input rotation speed $\omega i$ as a result of the shift in process of the variation stops, so a shift shock may occur. In the present embodiment, during a transition of the first shift, the electronic control unit 70 decreases the second-shift released-side clutch torque as compared to that before the start of the first shift. That is, in order for the second-shift released-side clutch to quickly generate differential rotation at the time of changing into the second shift, the second-shift released-side clutch torque is decreased in advance during the first shift in preparations for the second shift. However, in the above-described equation of motion of gear train, it is assumed that the engagement device not associated with a corresponding shift has no differential rotation (differential rotation speed=0). Therefore, in order not to decrease the accuracy of the equation of motion of gear train corresponding to the first shift, the second-shift released-side clutch torque during the first shift needs to be larger than or equal to a value at which the second-shift released-side clutch not associated with the first shift has no differential rotation.

The electronic control unit 70, for example, determines the changing timing from the first shift to the second shift in the case where the intermediate gear speed is set on the basis of at least one of the transmission input rotation speed $\omega i$ and the differential rotation speed between the engagement devices associated with the first shift (the first-shift engaged-side clutch and the first-shift released-side clutch). For example, after changing the torque shares xapl1, xdrn1 between the first-shift engaged-side clutch and the first-shift released-side clutch (that is, exchanging torque (changing application of torque) between the released-side clutch and the engaged-side clutch in the first shift) has completed and the differential rotation speed between the engagement devices associated with the first shift has reached a predetermined value, the shift is changed into the second shift. The predetermined value is an engagement completion determination value (for example, differential rotation speed=0) predetermined as the differential rotation speed for determining completion of engagement for the first-shift engaged-side clutch, and is a release completion determination value predetermined as the differential rotation speed for determining completion of release for the first-shift released-side clutch. Alternatively, in the power-off upshift or power-on downshift in which the torque shares are changed at the end of inertia phase, the shift is changed into the second shift in the case where changing the torque shares xapl1, xdrn1 has been completed and the transmission input rotation speed $\omega i$ has passed through a synchronous rotation speed at the intermediate gear speed. In other words, it is possible to determine how the torque capacities of the engagement devices associated with the first shift or the second shift act on the progress of shift on the basis of the transmission input rotation speed $\omega i$ or the differential rotation speed between the engagement devices associated with the first shift, so the shift is changed into the second shift when it is possible to generate clutch torque in a direction in which the shift is progressed (that is, a direction in which the transmission input rotation speed $\omega i$ approaches a post-shift synchronous rotation speed) even when the shift is changed from the first shift to the second shift. The transmission input rotation speed $\omega i$ and the differential rotation speed between the engagement devices associated with the first shift may be an actual value or may be a predicted value.

More specifically, in FIG. 2, the shift control unit 74 determines whether a shift in which two elements are released and two elements are engaged is being carried out on the basis of, for example, whether the shift in which two elements are released and two elements are engaged, determined to be carried out, has not finished yet.

When the shift control unit 74 has determined that the shift in which two elements are released and two elements are engaged is being carried out, intermediate gear speed setting means, that is, an intermediate gear speed setting unit 82, sets a predetermined intermediate gear speed corresponding to the shift being carried out.

When the shift control unit 74 has determined that the automatic transmission 18 is carrying out the shift in which two elements are released and two elements are engaged, the control operation amount calculation unit 76, during a transition of a first shift that is a shift from a pre-shift gear speed to the intermediate gear speed, calculates the control operation amounts with the use of the shift model corresponding to the first shift as in the case during a shift in which one element is released and one element is engaged. Subsequent to the first shift, during a transition of a second shift that is a shift from the intermediate gear speed to a post-shift gear speed, the control operation amount calculation unit 76 calculates the control operation amounts with the use of the shift model corresponding to the second shift as in the case during a shift in which one element is released and one element is engaged.

In addition, during a transition of the first shift, the control operation amount calculation unit 76 calculates a required value of the second-shift released-side clutch torque with the use of the shift mode corresponding to the second shift. At this time, initial values before the start of the second shift are set for the torque shares (x2, xapl2, xdrn2) in the shift model corresponding to the second shift. In addition, it is assumed that the differential rotation speed of the second-shift released-side clutch is zero in the shift model corresponding to the first shift, so the shift target value in the shift model corresponding to the second shift is set such that the second-shift released-side clutch has no differential rotation during a transition of the first shift. For example, the input shaft angular acceleration dωt/dt (=(output shaft angular acceleration dωo/dt)×(gear ratio of the intermediate gear speed)) with an increase in the vehicle speed V is set (for example, when the vehicle speed V is constant, zero is set) as the target value of the input shaft angular acceleration dωt/dt. In addition, a value of ((actual value of the transmission input torque Ti)×(gear ratio of the intermediate gear speed)) is set as the target value of the transmission output torque To. However, a base value that does not include an engine torque reduction amount for canceling inertia torque is desirably used as the actual value of the transmission input torque Ti. A target value in the shift model corresponding to the first shift may be directly used as the target value of the transmission output torque To.

The control operation amount calculation unit 76 determines whether to change from the first shift to the second shift on the basis of whether changing the torque shares xapl1, xdrn1 in the first shift has been completed and the transmission input rotation speed ωi has passed through the synchronous rotation speed at the intermediate gear speed or the differential rotation speed between the engagement devices associated with the first shift has reached the predetermined value.

Figure 5:
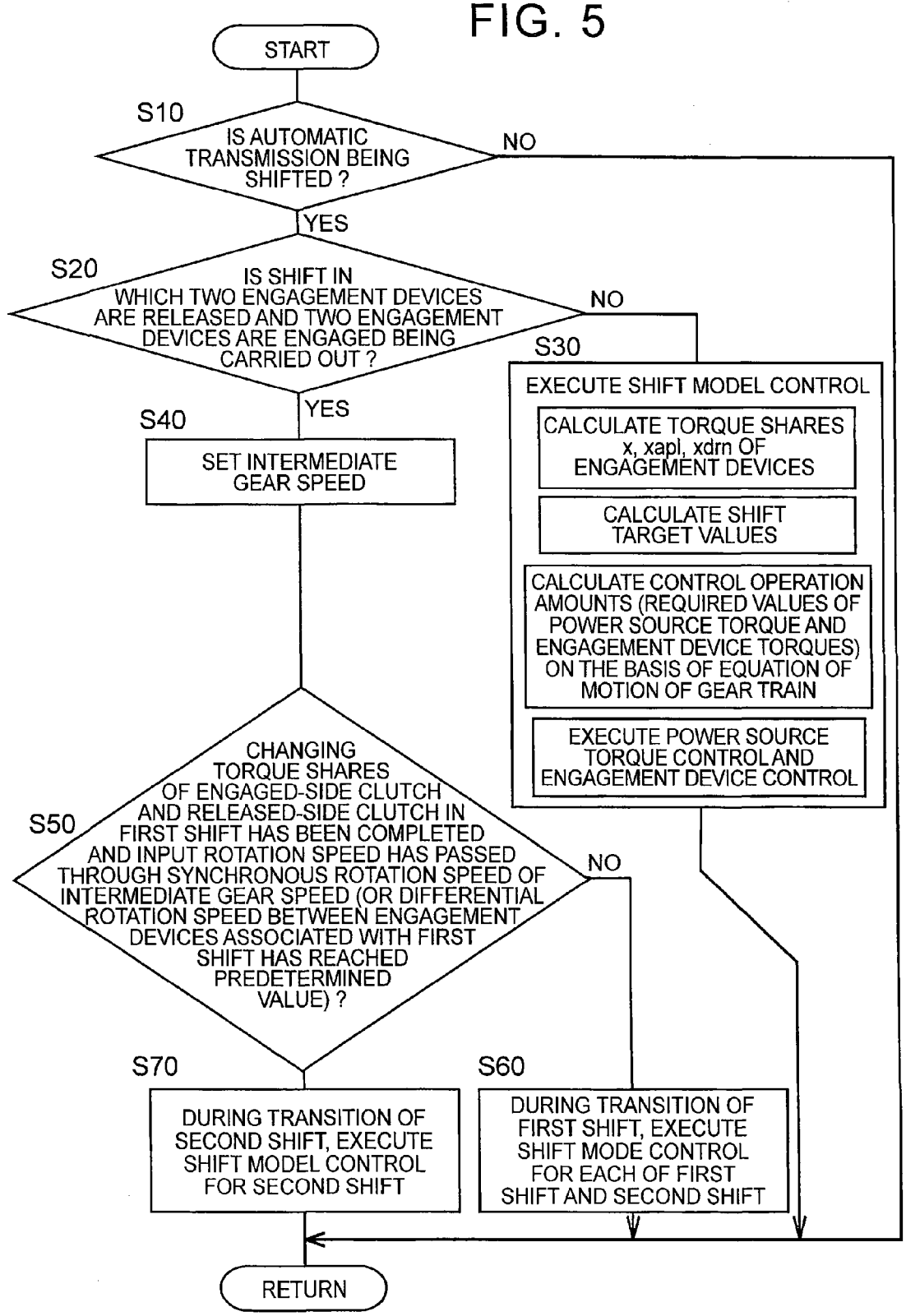
FIG. 5 is a flowchart that illustrates control operations for appropriately carrying out a desired shift of the automatic transmission with the use of a shift model even when a relevant portion of the control operations of the electronic control unit, that is, a shift in which two elements are released and two elements are engaged, occurs.
Figure 6:
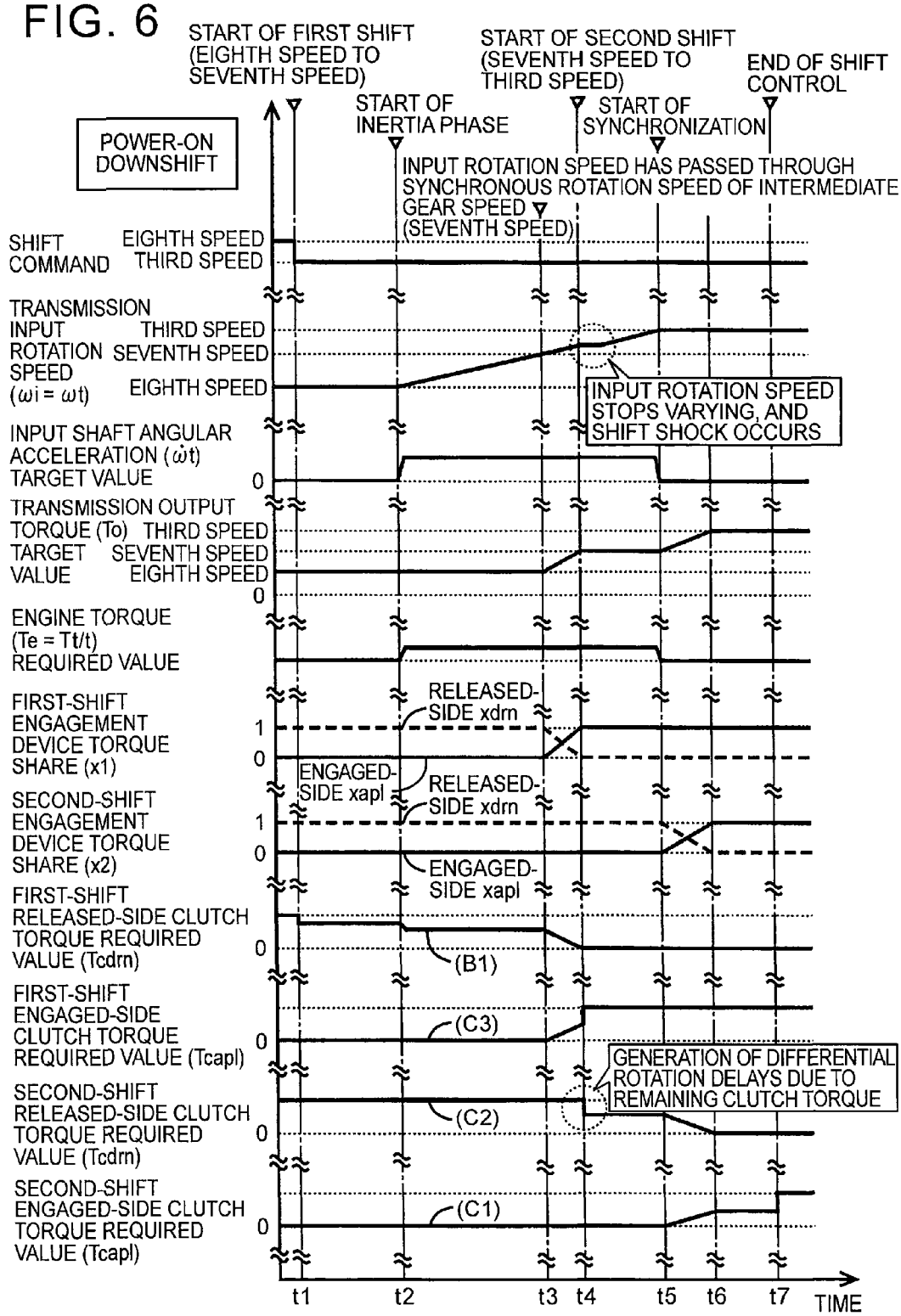
FIG. 6 is a time chart in the case where the control operations shown in the flowchart of FIG. 5 are executed, and is an example of the case where a shift is carried out by setting an intermediate gear speed at the time of a shift in which two elements are released and two elements are engaged in the power-on downshift.
Figure 7:
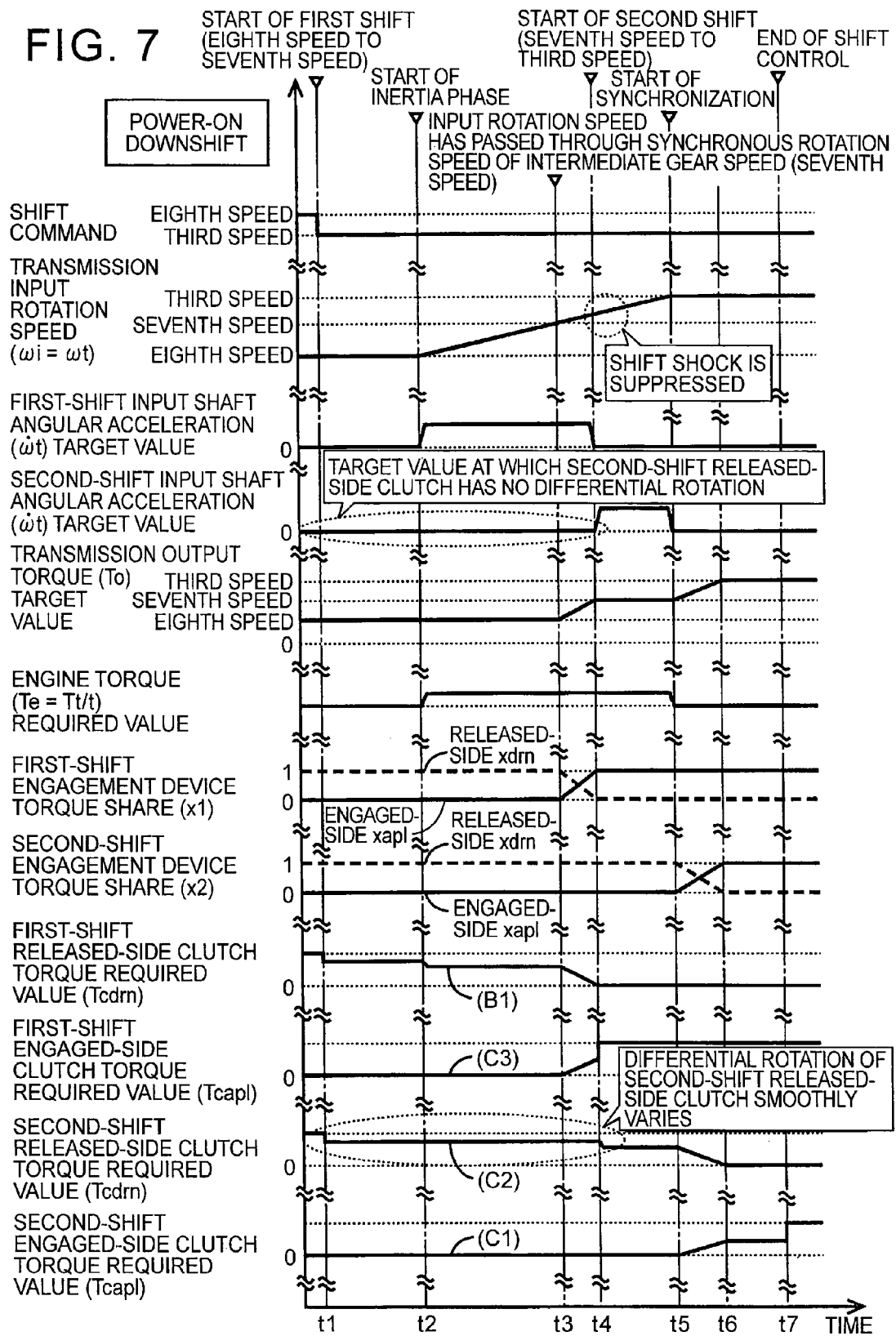
FIG. 7 is a time chat in the case where the control operations shown in the flowchart of FIG. 5, and is an example of the case where a shift is carried out by setting an intermediate gear speed at the time of a shift in which two elements are released and two elements are engaged in the power-on downshift.
Figure 8:
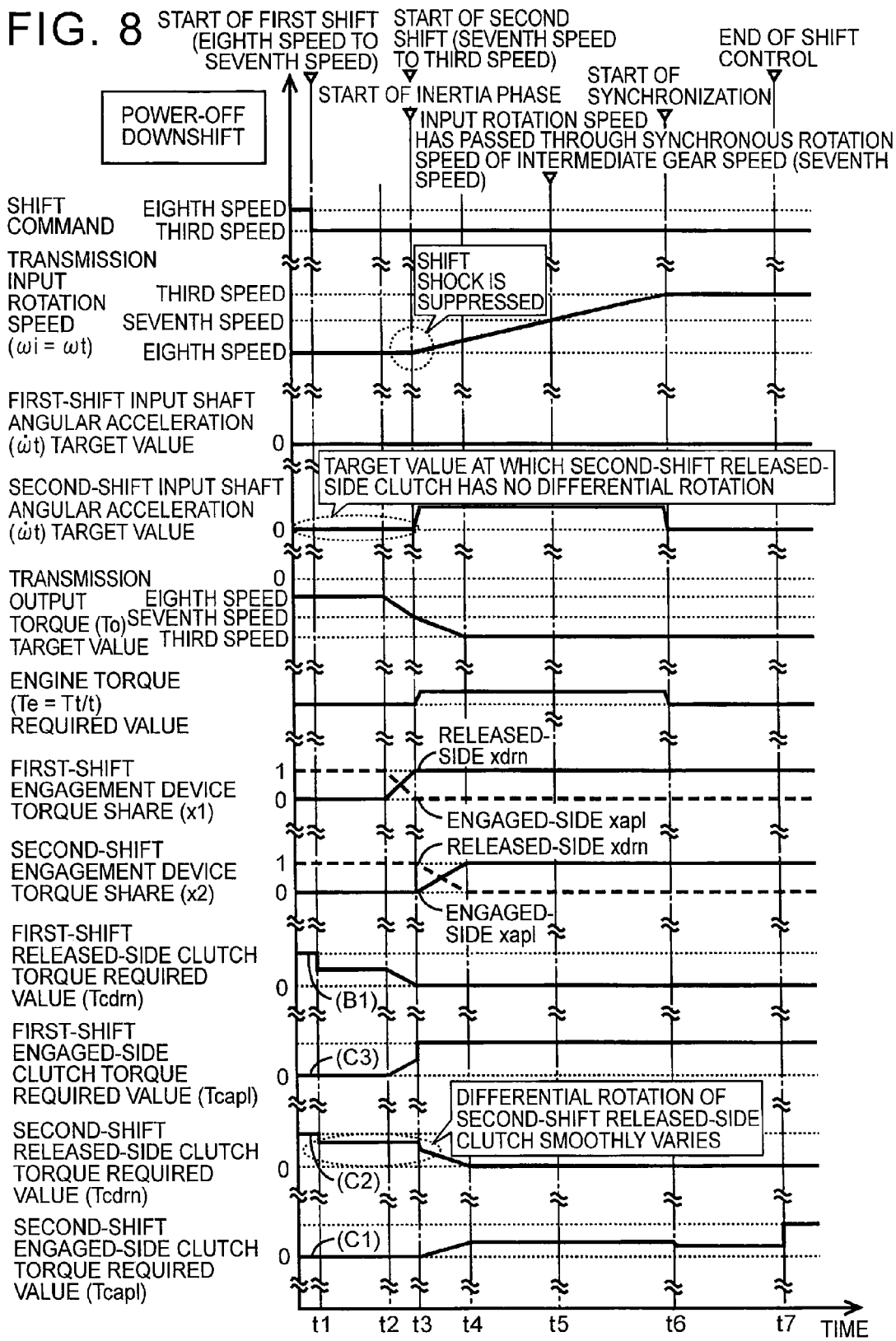
FIG. 8 is a time chart in the case where the control operations shown in the flowchart of FIG. 5 are executed, and is an example of the case where a shift is carried out by setting an intermediate gear speed at the time of a shift in which two elements are released and two elements are engaged in the power-off downshift.
Figure 9:
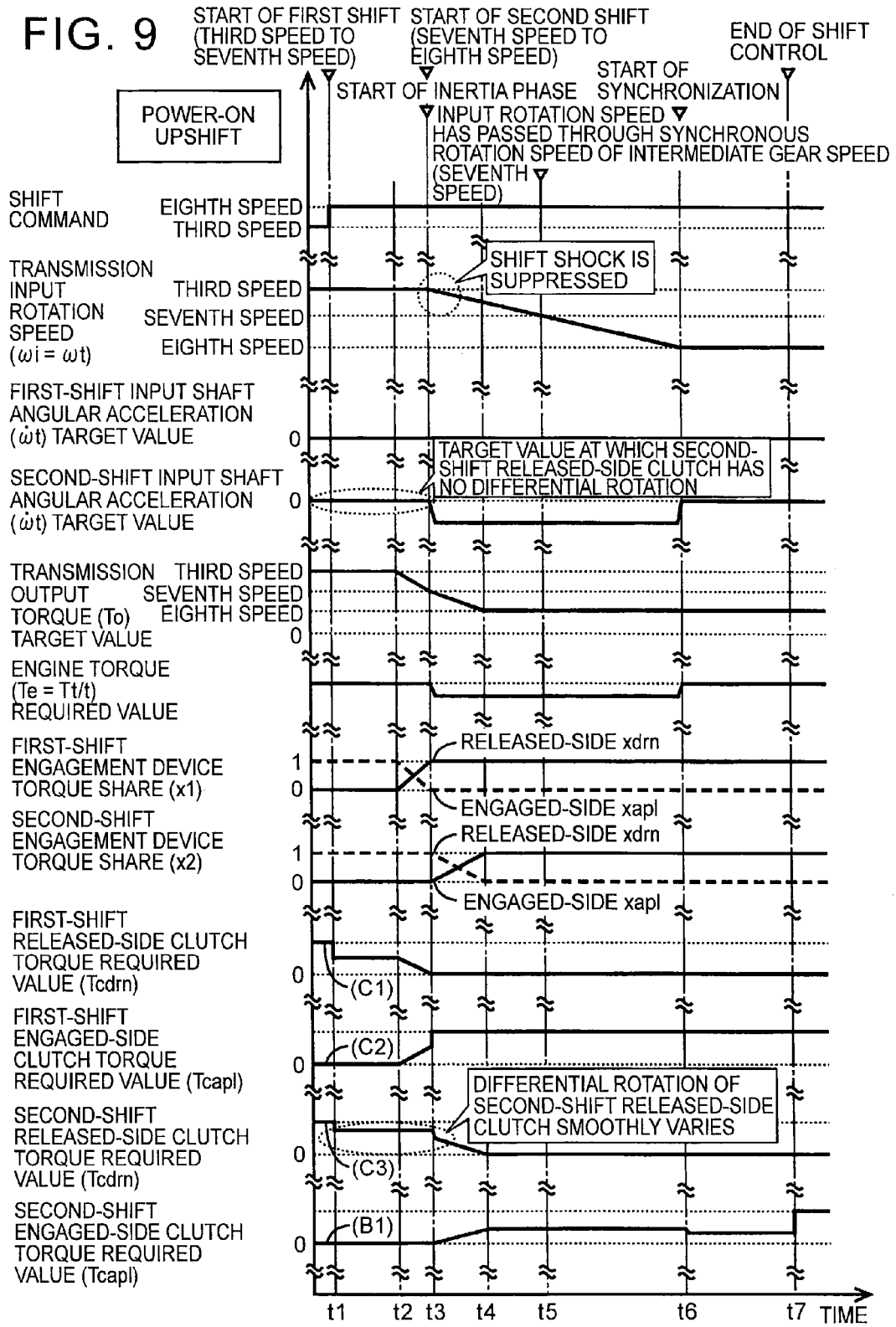
FIG. 9 is a time chart in the case where the control operations shown in the flowchart of FIG. 5 are executed, and is an example of the case where a shift is carried out by setting an intermediate gear speed at the time of a shift in which two elements are released and two elements are engaged in the power-on upshift.
Figure 10:
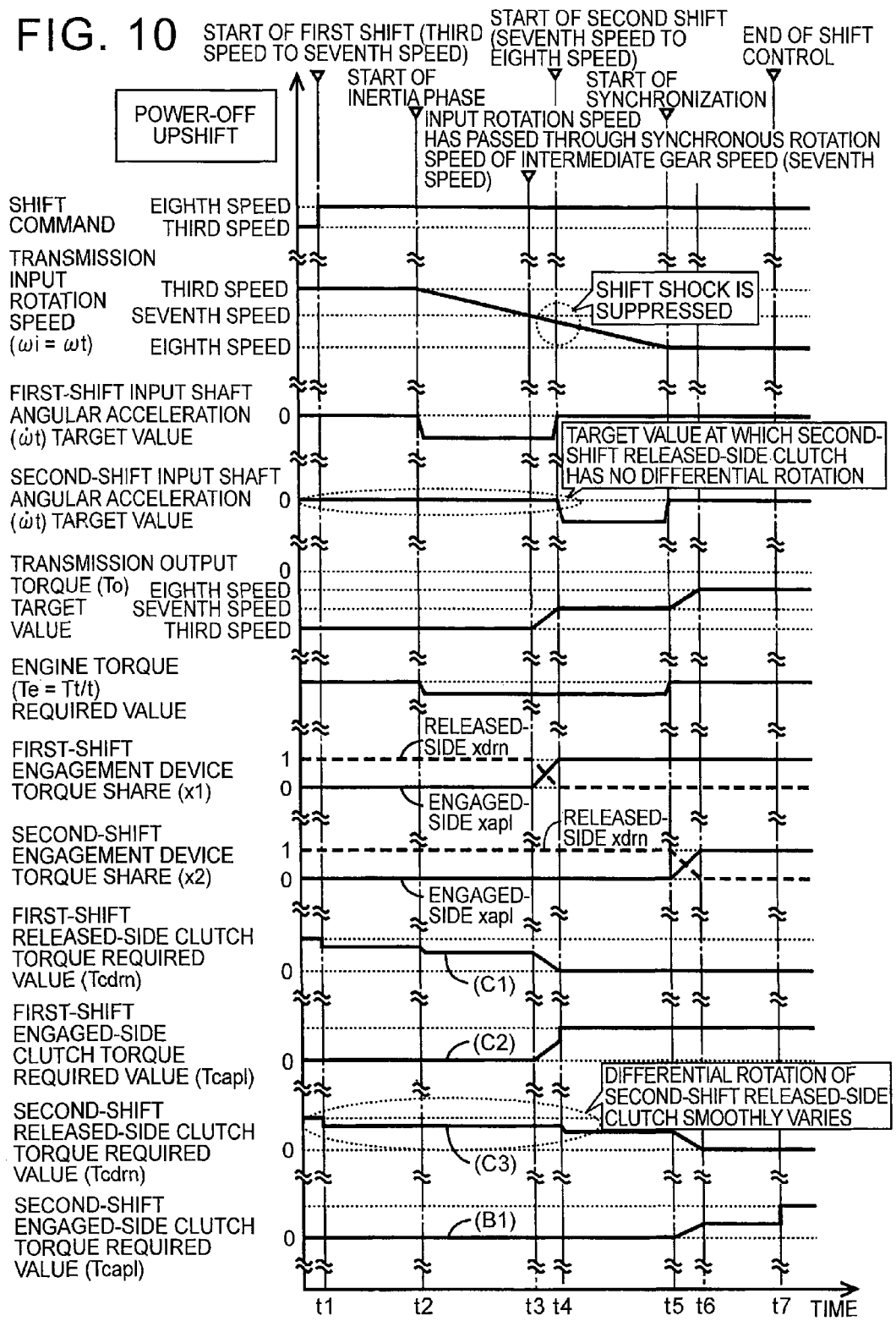
FIG. 10 is a time chart in the case where the control operations shown in the flowchart of FIG. 5 are executed, and is an example of the case where a shift is carried out by setting an intermediate gear speed at the time of a shift in which two elements are released and two elements are engaged in the power-off upshift.

FIG. 5 is a flowchart that illustrates a relevant portion of control functions of the electronic control unit 70, that is, control operations for appropriately shifting the automatic transmission 18 in a desired manner with the use of the shift model even when there occurs a shift in which two elements are released and two elements are engaged. The flowchart is, for example, repeatedly executed at an extremely short cycle time of about several milliseconds to several tens of milliseconds. FIG. 6, FIG. 7, FIG. 8, FIG. 9 and FIG. 10 are time charts in the case where the control operations shown in the flowchart of FIG. 5 are executed. FIG. 6 and FIG. 7 show an example of the case where a shift is carried out by setting the intermediate gear speed at the time of a shift in which two elements are released and two elements are engaged in the power-on downshift. FIG. 8 shows an example of the case where a shift is carried out by setting the intermediate gear speed at the time of a shift in which two elements are released and two elements are engaged in the power-off downshift. FIG. 9 shows an example of the case where a shift is carried out by setting the intermediate gear speed at the time of a shift in which two elements are released and two elements are engaged in the power-on upshift. FIG. 10 shows an example of the case where a shift is carried out by setting the intermediate gear speed at the time of a shift in which two elements are released and two elements are engaged in the power-off upshift.

In FIG. 5, initially, in step (hereinafter, step is omitted) S10 corresponding to the shift control unit 74, for example, it is determined whether the automatic transmission 18 is being shifted. When negative determination is made in S10, the routine ends. When affirmative determination is made in S10, it is determined in S20 corresponding to the shift control unit 74 whether a shift in which two elements are released and two elements are engaged is being carried out (time t1 to time t7 in FIG. 6 to FIG. 10). When negative determination is made in S20, in S30 corresponding to the control operation amount calculation unit 76, the engine output control unit 72 and the shift control unit 74, normal shift model control in a shift in which one element is released and one element is engaged is executed. For example, in the step corresponding to the torque share calculation unit 78, the torque shares (x, xapl, xdrn) of the engagement devices are calculated with the use of the shift progress degree map. Subsequently, in the step corresponding to the shift target value calculation unit 80, the shift target values (the target values of the input shaft angular acceleration dωt/dt and transmission output torque To) are calculated. Subsequently, in the step corresponding to the control operation amount calculation unit 76, the control operation amounts (the required values of the engine torque Te, engaged-side clutch torque Tcapl and released-side clutch torque Tcdrn) are calculated on the basis of the calculated torque shares of the engagement devices and the calculated shift target values from the relational expressions for calculating the control operation amounts. Subsequently, in the step corresponding to the engine output control unit 72 and the shift control unit 74, the engine output control command signal Se and the hydraulic pressure command signal Sp are output, and the engine 12, the released-side clutch and the engaged-side clutch are controlled such that the calculated control operation amounts are obtained. On the other hand, when affirmative determination is made in S20, in S40 corresponding to the intermediate gear speed setting unit 82, the predetermined intermediate gear speed, corresponding to the determined shift in which two elements are released and two elements are engaged, is set (time t1 in FIG. 6 to FIG. 10). Subsequently, in S50 corresponding to the control operation amount calculation unit 76, it is determined whether changing the torque shares xapl1, xdrn1 in the first shift has been completed and the transmission input rotation speed ωi has passed through the synchronous rotation speed in the intermediate gear speed or the differential rotation speed between the engagement devices associated with the first shift has reached the predetermined value (time t1 to time t4 in FIG. 6, FIG. 7 and FIG. 10, and time t1 to time t3 in FIG. 8 and FIG. 9). When negative determination is made in S50 (that is, when it is in a transition of the first shift), in S60 corresponding to the control operation amount calculation unit 76, the engine output control unit 72 and the shift control unit 74, shift model control for the first shift is executed during a transition of the first shift as in the case of S30 (time t1 to time t4 in FIG. 6, FIG. 7 and FIG. 10, and time t1 to time t3 in FIG. 8 and FIG. 9). That is, the control operation amounts are calculated with the use of the shift model corresponding to the first shift, and the first shift is carried out. In addition, during a transition of the first shift, shift model control for the second shift is also executed. That is, the required value of the second-shift released-side clutch torque is calculated with the use of the shift model corresponding to the second shift. In the shift model corresponding to the second shift, initial values before the start of the second shift are, for example, set as the torque shares xapl2, xdrn2, and, for example, a value that does not cause the second-shift released-side clutch to have differential rotation is set as the shift target value. When affirmative determination is made in S50 (that is, when the shift is changed into the second shift), in S70 corresponding to the control operation amount calculation unit 76, the engine output control unit 72 and the shift control unit 74, shift model control for the second shift is executed during a transition of the second shift as in the case of S30 (time t4 to time t7 in FIG. 6, FIG. 7 and FIG. 10, and time t3 to time t7 in FIG. 8 and FIG. 9). That is, the control operation amounts are calculated with the use of the shift model corresponding to the second shift, and the second shift is carried out.

In FIG. 6 to FIG. 10, for example, the required values for achieving the target values are determined with the use of the shift model corresponding to the first shift, and shift control for the first shift is started (time t1). When the shift is changed from the first shift to the second shift, the required values for achieving the target values are determined with the use of the shift model corresponding to the second shift, and shift control for the second shift is started (time t4 in FIG. 6, FIG. 7 and FIG. 10, time t3 in FIG. 8 and FIG. 9). Embodiments of FIG. 6 and FIG. 7 show the case of the power-on downshift, and the embodiment of FIG. 10 shows the case of the power-off upshift. Therefore, in order to cause the first shift and the second shift to appropriately progress, the timing at which the torque shares are changed is set to timing at which the transmission input rotation speed $\omega i$ is substantially close to the synchronous rotation speed of the intermediate gear speed (time t3 to time t4) after the start of inertia phase (time t2) and timing of the end of inertia phase at which the transmission input rotation speed $\omega i$ is substantially close to the post-shift synchronous rotation speed (time t5 to time t6), and then the overall shift control is ended (time t7). The embodiment of FIG. 8 shows the case of the power-off downshift, and the embodiment of FIG. 9 shows the case of the power-on upshift. Therefore, in order to cause the first shift and the second shift to appropriately progress, the timing at which the torque shares are changed is set to timing before the start of inertia phase (time t3) (time t2 to time t3) and timing before the passage (time t5; the start of inertia phase of the second shift) of the synchronous rotation speed of the intermediate gear speed (time t3 to time t4), and then the overall shift control is ended (time t7) through the start of synchronization (time t6).

In addition, FIG. 6 shows the embodiment in which the required value of the second-shift released-side clutch torque is not decreased during a transition of the first shift, and FIG. 7 to FIG. 10 show the embodiment in which the required value of the second-shift released-side clutch torque is decreased within the range in which the second-shift released-side clutch has no differential rotation during a transition of the first shift. Therefore, in the embodiment of FIG. 6, a relatively large amount of the second-shift released-side clutch torque remains at the time of the start of the second shift, so generation of the differential rotation of the second-shift released-side clutch is delayed, and a variation in the transmission input rotation speed $\omega i$ stops, with the result that a shift shock occurs. In contrast to this, in the embodiment shown in FIG. 7 to FIG. 10, the differential rotation of the second-shift released-side clutch smoothly varies at the time of the start of the second shift, so a variation in the transmission input rotation speed $\omega i$ does not stop, and a shift shock is suppressed.

As described above, in a situation that the equation of motion including the mathematical expression (1) and the mathematical expression (2) is not solved unless a constraint condition is set for the equation of motion, the torque share x is set as the constraint condition in the present embodiment. Therefore, it is suitable to control an exchange of torque between the engagement devices, which is difficult in shift control, and it is possible to solve the equation of motion. In other words, the torque share x that expresses an exchange of torque is set as the constraint condition, so it is possible to handle any shift pattern with the use of the predetermined shift model. Specifically, by setting the torque share x suitable to control the shift progress degree as the constraint condition, occurrence of tie-up or racing is suppressed, and, conversely, the controllability of control for causing tie-up or racing to occur on purpose improves. It is possible to appropriately execute engine torque reduction control. In this way, according to the present embodiment, even when there are three control operation amounts for two shift target values, it is possible to appropriately determine the three control operation amounts with the use of the shift model and then shift the automatic transmission 18 in a desired manner such that the two shift target values are achieved.

In addition, according to the present embodiment, at the time of the shift in which two elements are released and two elements are engaged, the first shift in which one element is released and one element is engaged and the second shift in which one element is released and one element is engaged are carried out. Therefore, three control operation amounts are used in each of the first shift and the second shift, so it is possible to solve the equation of motion. Thus, according to the invention, it is possible to further appropriately shift the automatic transmission 18 in a desired manner with the use of the shift model.

In addition, according to the present embodiment, the second-shift released-side clutch torque is decreased during a transition of the first shift as compared to that before the start of the first shift. Therefore, excessive remainder of the second-shift released-side clutch torque at the time of changing into the second shift is avoided, and it is possible to quickly generate the differential rotation of the second-shift released-side clutch, with the result that a shift shock is suppressed.

In addition, according to the present embodiment, the required value of the second-shift released-side clutch torque during a transition of the first shift is calculated with the use of the shift model (equation of motion) corresponding to the second shift. Therefore, it is possible to calculate the required value of the second-shift released-side clutch torque as a continuous value before and after changing into the second shift, and it is possible to smoothly generate the differential rotation of the second-shift released-side clutch, with the result that a shift shock is appropriately suppressed. Additionally, the shift target values in the shift model corresponding to the second shift are set such that the second-shift released-side clutch has no differential rotation during a transition of the first shift. Therefore, it is possible to satisfy the precondition of the shift model (equation of motion) corresponding to the first shift, that is, the differential rotation speed of the second-shift released-side clutch is set to zero during the first shift, it is possible to keep the accuracy of the shift model corresponding to the first shift, and it is possible to accurately achieve the desired shift target values.

In addition, according to the present embodiment, the shift is changed from the first shift to the second shift on the basis of at least one of the transmission input rotation speed ωi and the differential rotation speed between the engagement devices associated with the first shift. Therefore, it is possible to change between the first shift and the second shift on the basis of how the clutch torques act on the progress of shift, and it is possible to achieve the required values of the clutch torques even at the time of a change of a direction in which the torque capacity that is generatable during a transition of the shift acts on the progress of shift.

In addition, according to the present embodiment, the control operation amounts are calculated on the basis of the shift target values by using the equation of motion including the mathematical expression (1) and the mathematical expression (2) and the relationships of the mathematical expression (3) and the mathematical expression (4). Therefore, it is possible to incorporate control associated with an exchange of torque, which is difficult in shift control, into the above equation of motion, and it is possible to appropriately determine the three control operation amounts.

The embodiments of the invention are described in detail with reference to the drawings, and the invention is also applicable to other embodiments.

Figure 11:
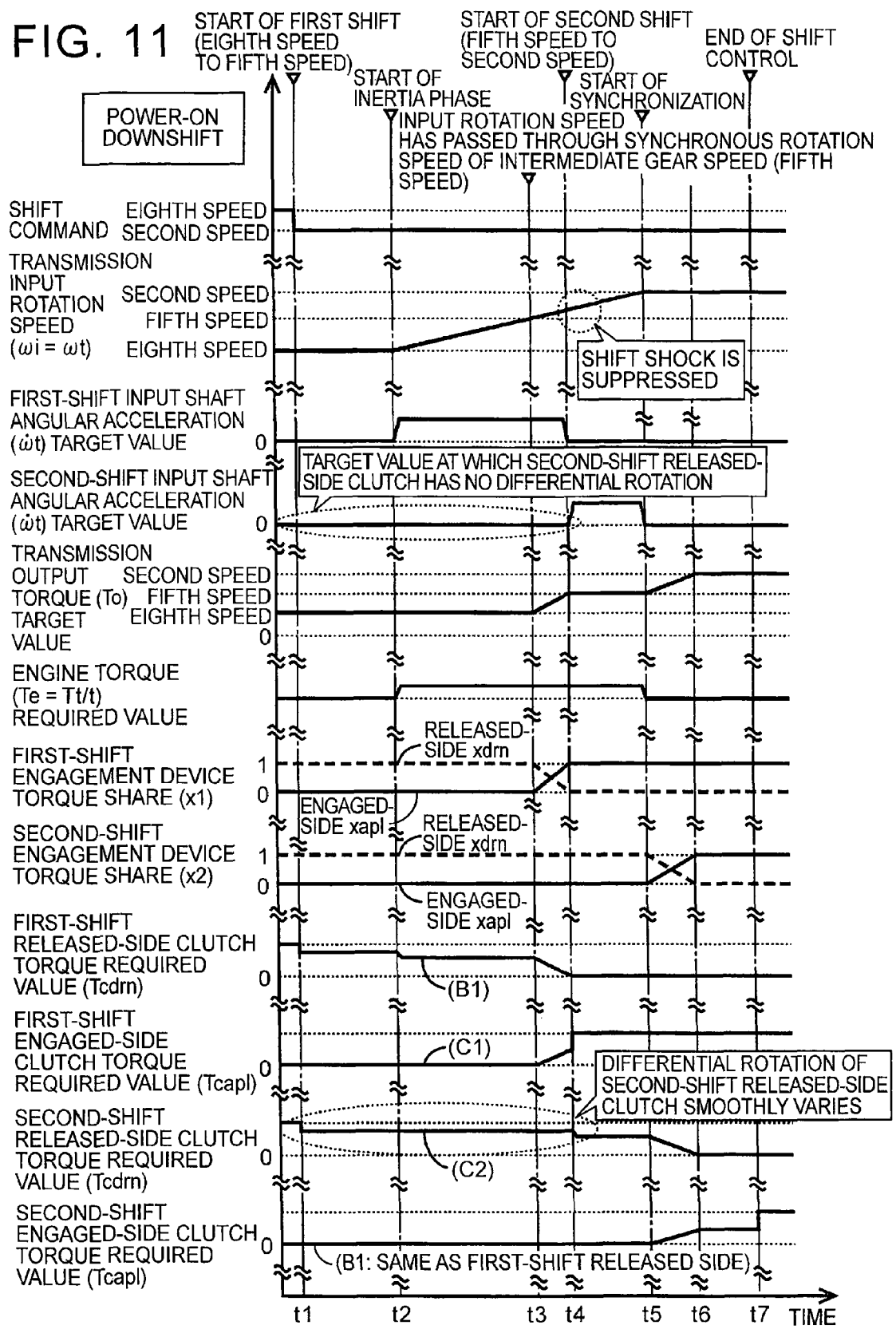
FIG. 11 is a view that shows an example of the case where a shift is carried out by setting an intermediate gear speed at the time of a shift in which one element is released and one element is engaged and in which a heat absorption amount of engagement devices associated with the shift may excessively increases.

For example, in the above-described embodiments, at the time of a shift in which two elements are released and two elements are engaged, the shift is carried out by setting the intermediate gear speed and carrying out the first shift and the second shift; however, the invention is not limited to this configuration. At the time of a shift in which one element is released and one element is engaged such that a heat absorption amount of the engagement devices associated with the shift may excessively increase, the shift may be carried out by setting the intermediate gear speed and carrying out the first shift and the second shift. FIG. 11 is a view that shows an example of the case where a shift is carried out by setting the intermediate gear speed at the time of the shift in which one element is released and one element is engaged and a heat absorption amount of the engagement devices associated with the shift may excessively increase. In FIG. 11, at the time of an eighth to second power-on downshift, the fifth gear speed is set as the intermediate gear speed, and an eighth to fifth downshift as the first shift and a fifth to second downshift as the second shift are sequentially carried out. For example, at the time of a high load, such as power-on, in which the engine torque Te is large, a heat absorption amount during a slip of the released-side clutch (C2) at the time of the eighth to second shift tends to excessively increase, so, even at the time of the shift in which one element is released and one element is engaged, the shift is carried out by setting the intermediate gear speed on purpose as in the case of the shift in which two elements are released and two elements are engaged. Thus, the durability of the engagement devices improves.

In the above-described embodiments, by calculating the required value of the second-shift released-side clutch torque with the use of the shift model corresponding to the second shift during a transition of the first shift, the second-shift released-side clutch torque is decreased as compared to that before the start of the first shift; however, the invention is not limited to this configuration. For example, an adapted value predetermined such that the second-shift released-side clutch has no differential rotation during a transition of the first shift may be used as the required value of the second-shift released-side clutch torque.

In the above-described embodiments, during a transition of the first shift, the second-shift released-side clutch torque does not always need to be decreased as compared to that before the start of the first shift. In this case, particularly, in step S60 of the flowchart of FIG. 5, only shift model control for the first shift is executed during a transition of the first shift. In this way as well, three control operation amounts are used in each of the first shift and the second shift, so it is possible to obtain certain advantageous effects that it is possible to solve the equation of motion.

In step S30 of the flowchart of FIG. 5 in the above-described embodiments, it is possible to change the order of executing steps as needed, for example, the order of executing the step of calculating the torque shares and the step of calculating the shift target values may be interchanged.

In the above-described embodiment, the output shaft 20 is illustrated as the output shaft 20-side rotating member; however, the invention is not limited to this configuration. The output shaft 20-side rotating member may be a rotating member in the power transmission path from the output shaft 20 to the drive wheels 26. The input shaft 16 is illustrated as the input shaft 16-side rotating member; however, the invention is not limited to this configuration. The input shaft 16-side rotating member may be a rotating member in the power transmission path from the engine 12 to the input shaft 16.

The above-described embodiment is only illustrative, and the invention may be implemented in modes including various modifications and improvements on the basis of the knowledge of persons skilled in the art.

The invention claimed is:

1. A shift control device for a vehicle including an automatic transmission that has a plurality of engagement devices, the plurality of engagement devices transmitting rotation and torque between an input shaft that receives power from a driving force source and an output shaft that transmits power to a drive wheel, the automatic transmission being shifted by switching between engaged and released states of each of the engagement devices, the shift control device being configured to carry out a shift of the automatic transmission with the use of a predetermined shift model with which control operation amounts are determined to achieve shift target values, the shift control device comprising:

an electronic control unit configured to carry out the shift of the automatic transmission with the use of the shift model by:
(i) setting the shift target values on the basis of two values that are a torque of a rotating member on the output shaft side and a speed variation amount of a rotating member on the input shaft side,
(ii) setting the control operation amounts on the basis of three values that are a torque of the rotating member on the input shaft side, a torque capacity of an engaged one of the engagement devices during the shift and a torque capacity of a released one of the engagement devices during the shift, and
(iii) setting torque shares of a transmission torque between the engaged one of the engagement devices and the released one of the engagement devices during the shift, the electronic control unit being configured to, at the time of a shift between gear speeds, which is carried out by releasing two of the engagement devices and engaging other two of the engagement devices, carry out the shift by carrying out a first shift and a second shift through an intermediate gear speed, the electronic control unit being configured to carry out the first shift from a pre-shift gear speed to the intermediate gear speed by releasing one of the engagement devices and engaging another one of the engagement devices and to carry out the second shift from the intermediate gear speed to a post-shift gear speed by releasing one of the engagement devices and engaging another one of the engagement devices.

2. The shift control device according to claim 1, wherein the electronic control unit is configured to, during a transition of the first shift, reduce the torque capacity of the released one of the engagement devices in the second shift as compared to that before a start of the first shift.

3. The shift control device according to claim 2, wherein the electronic control unit is configured to calculate a required value of the torque capacity of the released one of the engagement devices in the second shift during a transition of the first shift by using an equation of motion of the automatic transmission, including the shift target values and the control operation amounts, corresponding to the second shift, and the electronic control unit is configured to set the shift target values in the equation of motion corresponding to the second shift such that the released one of the engagement devices in the second shift has no differential rotation during a transition of the first shift.

4. The shift control device according to claim 1, wherein the electronic control unit is configured to change from the first shift to the second shift on the basis of at least one of a rotation speed of the rotating member on the input shaft side and a differential rotation speed between the engagement devices associated with the first shift.

5. The shift control device according to claim 1, wherein the electronic control unit is configured to calculate the control operation amounts on the basis of the shift target values by using an equation of motion of the automatic transmission, including the shift target values and the control operation amounts, and a relationship that expresses the torque shares, as the shift model.

6. A shift control method for a vehicle including an electronic control unit and an automatic transmission that has a plurality of engagement devices, the plurality of engagement devices transmitting rotation and torque between an input shaft that receives power from a driving force source and an output shaft that transmits power to a drive wheel, the automatic transmission being shifted by switching between engaged and released states of each of the engagement devices, the shift control method, executed by the electronic control unit, comprising:

carrying out a shift of the automatic transmission with the use of a predetermined shift model with which control operation amounts are determined to achieve shift target values;

carrying out the shift of the automatic transmission with the use of the shift model by:

(i) setting the shift target values on the basis of two values that are a torque of a rotating member on the output shaft side and a speed variation amount of a rotating member on the input shaft side, (ii) setting the control operation amounts on the basis of three values that are a torque of the rotating member on the input shaft side, a torque capacity of an engaged one of the engagement devices during the shift and a torque capacity of a released one of the engagement devices during the shift, and (iii) setting torque shares of a transmission torque between the engaged one of the engagement devices and the released one of the engagement devices during the shift; and at the time of a shift between gear speeds, which is carried out by releasing two of the engagement devices and engaging other two of the engagement devices, carrying out the shift by carrying out a first shift and a second shift through an intermediate gear speed, the first shift being carried out from a pre-shift gear speed to the intermediate gear speed by releasing one of the engagement devices and engaging another one of the engagement devices, the second shift being carried out from the intermediate gear speed to a post-shift gear speed by releasing one of the engagement devices and engaging another one of the engagement devices.

7. The shift control method according to claim 6, wherein during a transition of the first shift, the torque capacity of the released one of the engagement devices in the second shift is reduced as compared to that before a start of the first shift.

8. The shift control method according to claim 7, wherein a required value of the torque capacity of the released one of the engagement devices in the second shift during a transition of the first shift is calculated by using an equation of motion of the automatic transmission, including the shift target values and the control operation amounts, corresponding to the second shift, and the shift target values in the equation of motion corresponding to the second shift are set such that the released one of the engagement devices in the second shift has no differential rotation during a transition of the first shift.

9. The shift control method according to claim 1, wherein the shift of the automatic transmission is changed from the first shift to the second shift on the basis of at least one of a rotation speed of the rotating member on the input shaft side and a differential rotation speed between the engagement devices associated with the first shift.

10. The shift control method according to claim 6, wherein the control operation amounts are calculated on the basis of the shift target values by using an equation of motion of the automatic transmission, including the shift target values and the control operation amounts, and a relationship that expresses the torque shares, as the shift model.

* * * * *

UNITED STATES PATENT AND TRADEMARK OFFICE
CERTIFICATE OF CORRECTION

PATENT NO. : 9,441,731 B2  
APPLICATION NO. : 14/432285  
DATED : September 13, 2016  
INVENTOR(S) : Seiji Masunaga et al.

Page 1 of 1

It is certified that error appears in the above-identified patent and that said Letters Patent is hereby corrected as shown below:

On the Title Page

Item (73) Assignee should read: TOYOTA JIDOSHA KABUSHIKI KAISHA, Toyota (JP)

Signed and Sealed this  
Twenty-seventh Day of December, 2016

Michelle K. Lee  
*Director of the United States Patent and Trademark Office*